United States Patent
Ponting et al.

(10) Patent No.: US 12,119,180 B2
(45) Date of Patent: Oct. 15, 2024

(54) MULTILAYERED HIGH-TEMPERATURE DIELECTRIC FILM

(71) Applicant: Peak Nano Films, LLC, Valley View, OH (US)

(72) Inventors: Michael Ponting, Broadview Heights, OH (US); Zahidul Wahab, Solon, OH (US); Mason A. Wolak, Chagrin Falls, OH (US)

(73) Assignee: PEAK NANO FILMS, LLC, Valley View, OH (US)

( * ) Notice: Subject to any disclaimer, the term of this patent is extended or adjusted under 35 U.S.C. 154(b) by 0 days.

(21) Appl. No.: 18/430,123

(22) Filed: Feb. 1, 2024

(65) Prior Publication Data

US 2024/0266115 A1 Aug. 8, 2024

Related U.S. Application Data

(60) Provisional application No. 63/443,194, filed on Feb. 3, 2023.

(51) Int. Cl.
H01G 4/18 (2006.01)

(52) U.S. Cl.
CPC .................................... *H01G 4/18* (2013.01)

(58) Field of Classification Search
CPC ........ C08L 23/12; C08L 23/0823; H01G 4/18
See application file for complete search history.

(56) References Cited

U.S. PATENT DOCUMENTS

| | | | |
|---|---|---|---|
| 6,068,936 A * | 5/2000 | Peiffer | C08L 23/10 156/244.11 |
| 6,594,134 B2 | 7/2003 | Yializis | |
| 8,611,068 B2 | 12/2013 | Baer et al. | |
| 8,866,018 B2 | 10/2014 | Pramanik et al. | |
| 9,558,888 B2 | 1/2017 | Baer et al. | |
| 10,068,706 B2 | 9/2018 | Baer et al. | |
| 10,614,958 B2 | 4/2020 | Baer et al. | |
| 10,759,139 B2 | 9/2020 | Ponting | |
| 2007/0108490 A1 * | 5/2007 | Tan | H01G 4/20 257/296 |
| 2010/0172066 A1 * | 7/2010 | Baer | B32B 27/286 156/244.11 |
| 2021/0079179 A1 | 3/2021 | Alba et al. | |
| 2021/0147645 A1 * | 5/2021 | Goerlitz | C08J 5/18 |
| 2021/0291499 A1 | 9/2021 | Langhe et al. | |
| 2023/0391966 A1 * | 12/2023 | Goerlitz | C08J 5/18 |

FOREIGN PATENT DOCUMENTS

| | | | |
|---|---|---|---|
| EP | 4174120 A1 | 5/2023 | |
| WO | WO-2022089771 A1 * | 5/2022 | C08J 5/18 |

* cited by examiner

*Primary Examiner* — Mark S Kaucher
(74) *Attorney, Agent, or Firm* — NEO IP

(57) ABSTRACT

A multilayered dielectric film includes a plurality of nano-layers, with at least one first type of layer including traditional dielectric films and at least one second type of layer including high heat stability polymers. The consultant layered film demonstrates an improved storage modulus and decreased dissipation factor at high temperatures. The at least one first type of layer and the at least one second type of layer differ in dielectric permittivity by a factor of between approximately 0.5 and approximately 1.5 times.

16 Claims, 17 Drawing Sheets

MULTILAYERED HIGH-TEMPERATURE DIELECTRIC FILM

CROSS-REFERENCES TO RELATED APPLICATIONS

This application relates to and claims priority from the following U.S. patent applications. This application claims priority from U.S. Provisional Patent Application No. 63/443,194, filed Feb. 3, 2023. The above-mentioned application is incorporated herein by reference in its entirety.

BACKGROUND OF THE INVENTION

1. Field of the Invention

The present invention relates to thin films for use as dielectrics in capacitors, and more specifically to nanolayered dielectric thin films able to perform at high temperatures with comparatively low dielectric loss.

2. Description of the Prior Art

It is generally known in the prior art to provide thin films, serving as dielectrics for capacitors, including materials such as polyethylene terephthalate (PET), polypropylene (PP), biaxially-oriented polypropylene (BOPP), polyethylene naphthalate (PEN), polyphenylene sulfide (PPS), polytetrafluoroethylene (PTFE), polystyrene (PS), and polycarbonate (PC), among others.

Prior art patent documents include the following:

U.S. Pat. No. 8,866,018 for Passive electrical devices and methods of fabricating passive electrical devices by inventors Pramanik et al., filed Jan. 12, 2009 and issued Oct. 21, 2014, discloses a thin laminate passive electrical device, such as, a capacitor, and a method of fabricating a thin laminate passive electrical device. The passive electrical device includes two conductors, for example, copper foil conductors, separated by a dielectric having a first layer of a first material having a softening point temperature greater than a first temperature and a first layer of a second material having a softening point temperature less than the first temperature. The first temperature may be at least 150 degrees C. or higher. By providing a first layer having a higher softening point material, shorting across the conductors, that can be promoted by the fabrication process, is prevented. Methods of fabricating passive electrical devices are also disclosed.

U.S. Pat. No. 6,594,134 for Polymer film capacitor by inventor Yializis, filed Feb. 21, 2001 and issued Jul. 15, 2003, discloses a polymer film capacitor, utilizing a metallized film formed by a first vacuum-formed plasma treated surface, a vacuum-deposited, first radiation polymerized acrylate monomer film having first and second surfaces, the first surface being disposed on the first plasma-treated surface of the polymer substrate, and a metal layer disposed on the second surface of the first polymerized film. The metallized film is wound into a capacitor.

US Patent Pub. No. 2007/0108490 for Film capacitors with improved dielectric properties by inventors Tan et al., filed Nov. 14, 2005 and published May 17, 2007, discloses a film capacitor including a first electrode. The film capacitor also includes a first dielectric layer having a first dielectric constant disposed upon a first electrode and a second dielectric layer having a second dielectric constant disposed upon the first dielectric layer, wherein the second dielectric constant is at least fifty percent greater than the first dielectric constant. It further includes a second electrode disposed upon the second dielectric layer.

US Patent Pub. No. 2021/0291499 for Multicomponent layered dielectric film with surface modification by inventors Langhe et al., filed Jul. 18, 2019 and published Sep. 23, 2021, discloses a multicomponent dielectric film including overlapping dielectric layers and outer layers that have a higher surface energy compared to the overlapping dielectric layers, the overlapping dielectric layers including at least a first polymer material, a second polymer material, and optionally a third polymer material, adjoining dielectric layers defining a generally planar interface therebetween which lies generally in an x-y plane of an x-y-z coordinate system, the interfaces between the layers delocalizing the charge build up in the layers.

U.S. Pat. No. 10,614,958 for Multilayer polymer dielectric film by inventors Baer et al., filed Aug. 30, 2018 and issued Apr. 7, 2020, discloses a multilayer polymer dielectric film including a stack of coextruded, alternating first dielectric layers and second dielectric layers that receive electrical charge. The first dielectric layers include a first polymer material and the second dielectric layers include a second polymer material different from the first polymer material. The first polymer material has a permittivity greater than the second polymer material. The second polymer material has a breakdown strength greater than the first polymer material. Adjoining first dielectric layers and second dielectric layers define an interface between the layers that delocalizes electrical charge build-up in the layers. The stack has substantially the crystallographic symmetry before and during receiving electrical charge.

U.S. Pat. No. 8,611,068 for Multilayer polymer dialectric film having a charge-delocalizing interface by inventors Baer et al., filed Oct. 16, 2009 and issued Dec. 17, 2013, discloses a multilayer polymer dielectric film including a coextruded first dielectric layer and second dielectric layer. The first dielectric includes a first polymer material and the second dielectric layer includes a second polymer material. The first dielectric layer and the second dielectric layer defining an interface between the layers that delocalizes charges in the layers.

U.S. Pat. No. 9,558,888 for Multilayer polymer film having a charge-delocalizing interface by inventors Baer et al., filed Nov. 18, 2013 and issued Jan. 31, 2017, discloses a multilayer polymer dielectric film including a stack of coextruded, alternating first dielectric layers and second dielectric layers that receive electrical charge. The first dielectric layers include a first polymer material and the second dielectric layers include a second polymer material different from the first polymer material. The first polymer material has a permittivity greater than the second polymer material. The second polymer material has a breakdown strength greater than the first polymer material. Adjoining first dielectric layers and second dielectric layers define an interface between the layers that delocalizes electrical charge build-up in the layers. The stack has substantially the crystallographic symmetry before and during receiving electrical charge.

U.S. Pat. No. 10,068,706 for Multilayer polymer dielectric film by inventors Baer et al., filed Jan. 11, 2017 and issued Sep. 4, 2018, discloses a multilayer polymer dielectric film including a stack of coextruded, alternating first dielectric layers and second dielectric layers that receive electrical charge. The first dielectric layers include a first polymer material and the second dielectric layers include a second polymer material different from the first polymer material. The first polymer material has a permittivity greater than the second polymer material. The second polymer material has a breakdown strength greater than the first polymer material. Adjoining first dielectric layers and second dielectric layers define an interface between the layers that delocalizes electrical charge build-up in the layers. The stack has substantially the crystallographic symmetry before and during receiving electrical charge.

U.S. Pat. No. 10,759,139 for Multicomponent layered dielectric film and uses thereof by inventor Ponting, filed Dec. 4, 2015 and issued Sep. 1, 2020, discloses a multicomponent dielectric film including discrete overlapping dielectric layers of at least a first polymer material, a second polymer material, and a third polymer material. Adjoining dielectric layers define a generally planar interface therebetween which lies generally in an x-y plane of an x-y-z coordinate system. The interfaces between the layers delocalizing the charge build up in the layers. At least one dielectric layer including a stack of discrete polymer layers with polymer layer interfaces extending transverse to the x-y plane and optionally at least one filler having a higher dielectric constant than the first polymer material, the second polymer material, and/or the third polymer material.

US Patent Publication No. 2021/0079179 for Film Capacitor by inventors Alba et al., filed May 15, 2018 and published Mar. 18, 2021, discloses a film capacitor. In an embodiment a film capacitor includes a film comprising a blend of polypropylene and cyclo-olefin copolymer, wherein the blend includes an amount of at least two thirds by weight of polypropylene, and wherein the cyclo-olefin copolymer includes ethylene in a range of 23 weight % to 27 weight % inclusive and norbornene in a range of 73 weight % to 77 weight % inclusive.

SUMMARY OF THE INVENTION

The present invention relates to thin films for use as dielectrics in capacitors, and more specifically to nanolayered dielectric thin films able to perform at high temperatures with comparatively low dielectric loss.

It is an object of this invention to provide a dielectric thin film that maintains a low dissipation factor and relatively high storage modulus at high temperatures, such as temperatures higher than approximately 100° C.

In one embodiment, the present invention is directed to a high temperature performance dielectric film, including a coextruded plurality of layers, including a plurality of A layers and a plurality of B layers, wherein the plurality of A layers comprise at least one high temperature polymer, wherein the at least one high temperature polymer is a polymer having a glass transition temperature greater than 125° C. or a melting temperature greater than 200° C., and wherein the plurality of A layers have a dielectric permittivity between 0.5 and 1.5 times greater than the plurality of B layers.

In another embodiment, the present invention is directed to a high temperature performance dielectric film, including a coextruded plurality of layers, including a plurality of A layers and a plurality of B layers, wherein the plurality of A layers comprise at least one high temperature polymer, wherein the at least one high temperature polymer is a polymer having a glass transition temperature greater than 125° C. or a melting temperature greater than 200° C., and wherein the plurality of A layers consist of approximately 10% cyclic olefin copolymer and approximately 90% polypropylene.

In yet another embodiment, the present invention is directed to a high temperature performance dielectric film, including a coextruded and post-extrusion oriented plurality of layers, including a plurality of A layers and a plurality of B layers, wherein the plurality of A layers have a dielectric permittivity between 0.5 and 1.5 times greater than the plurality of B layers, wherein at least one of the coextruded and/or post-extrusion oriented plurality of layers have a thickness less than 150 nm, and wherein the film has a total thickness between approximately 3 µm and approximately 15 µm.

These and other aspects of the present invention will become apparent to those skilled in the art after a reading of the following description of the preferred embodiment when considered with the drawings, as they support the claimed invention.

DETAILED DESCRIPTION

Figure 1:
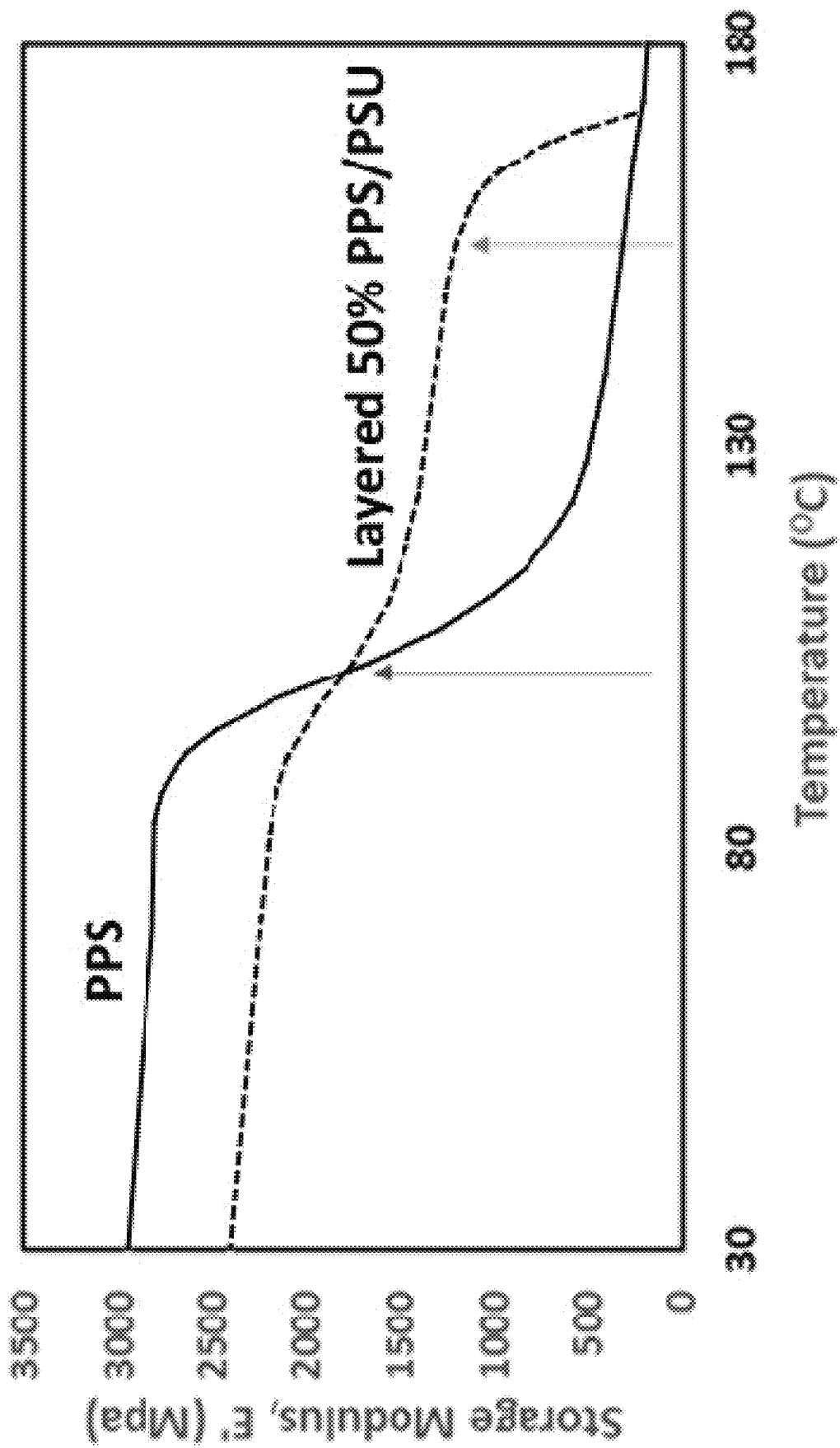
FIG. 1 illustrates a chart comparing the storage modulus of polyphenylsulfone (PPS) and a layered polymer structure of PPS and polysulfone (PSU) at different temperatures according to one embodiment of the present invention.

The present invention is generally directed to thin films for use as dielectrics in capacitors, and more specifically to nanolayered dielectric thin films able to perform at high temperatures with comparatively low dielectric loss.

In one embodiment, the present invention is directed to a high temperature performance dielectric film, including a coextruded plurality of layers, including a plurality of A layers and a plurality of B layers, wherein the plurality of A layers comprise at least one high temperature polymer, wherein the at least one high temperature polymer is a polymer having a glass transition temperature greater than 125° C. or a melting temperature greater than 200° C., and wherein the plurality of A layers have a dielectric permittivity between 0.5 and 1.5 times greater than the plurality of B layers.

In another embodiment, the present invention is directed to a high temperature performance dielectric film, including a coextruded plurality of layers, including a plurality of A layers and a plurality of B layers, wherein the plurality of A layers comprise at least one high temperature polymer, wherein the at least one high temperature polymer is a polymer having a glass transition temperature greater than 125° C. or a melting temperature greater than 200° C., and wherein the plurality of A layers consist of approximately 10% cyclic olefin copolymer and approximately 90% polypropylene.

In yet another embodiment, the present invention is directed to a high temperature performance dielectric film, including a coextruded and post-extrusion oriented plurality of layers, including a plurality of A layers and a plurality of B layers, wherein the plurality of A layers have a dielectric permittivity between 0.5 and 1.5 times greater than the plurality of B layers, wherein at least one of the coextruded and/or post-extrusion oriented plurality of layers have a thickness less than 150 nm, and wherein the film has a total thickness between approximately 3 μm and approximately 15 μm.

Thin-film capacitors are some of the most widely used capacitors today, being particularly advantageous when used in high-frequency applications compared to other types of capacitors (e.g., supercapacitors, ceramic capacitors, etc.) and tend to show good long-term stability and high temperature stability. However, while thin-film capacitors are known for having high temperature stability, the limits of these capacitors are becoming stretched with the need for new high-temperature applications, especially in electric vehicles (EVs), but also in situations such as oil and gas pipelines or in solar cells. These issues occur at high temperatures due to polymer chain relaxations, with shifts such as glass transition or crystal melting causing breakdown of the dielectric capabilities, and, at even high temperatures, the polymer layer often melts or deforms. As these high temperature applications, such as EVs, become more prominent, improved thin-film materials are needed to operate at higher operating temperatures with lower losses, allowing, for example, for higher frequency charge and discharge than previously possible.

Today, the materials used as dielectrics in thin-film capacitors are relatively limited. Five polymers dominate the market: polypropylene (PP) (including biaxially oriented PP, or BOPP), polyethylene terephthalate (PET) (including biaxially oriented PET, or BOPET), polyethylene naphthalate (PEN), polyphenylene sulfide (PPS), and polytetrafluoroethylene (PTFE), with PP and PET alone making up nearly 90% of the market share. In addition, while mostly phased out, polystyrene (PS), polycarbonate (PC), and paper are also sometimes used. However, polymers other than these are very rare in the industry and focus generally lies on the dielectric permittivity of the polymers.

Some prior art inventions have applied nanolayered polymer mixtures for use in thin film capacitors. The central concern of prior art inventions, such as U.S. Pat. No. 10,759,139, is to maximum electrical properties such as energy density, breakdown strength or dielectric permittivity of the layered structure, to maximum the overall dielectric properties of the film at normal operating temperatures. For example, the '139 patent suggest optimizing one polymer in a layered structure for energy density, while another is optimized for breakdown strength, and it also suggests altering the thickness and number of layers to maximize breakdown strength or energy density. U.S. Pat. No. 10,614,958 similarly attempts to maximum energy density by alternating between layers with high permittivity and layers with low permittivity (e.g., alternating dielectrics with insulating layers), with tie layers binding the two layer types. The '958 patent focuses on the fact that the maximum energy density is proportional to effective permittivity times square of dielectric strength, allowing for the whole system to have an energy density higher than any pure component. U.S. Pat. No. 10,068,706 provides a similar system to the '958 patent, emphasizing the potential for delocalization of charge build up with adjacent layers with substantially different breakdown strength. Notably, all these prior art documents attempt to maximum energy density and other electrical properties, but do not provide for improvement in high temperature stability for the capacitors. Furthermore, while high temperature operable capacitors do exist on the market today, the dissipation is too high or the breakdown strength too low at these temperatures for those capacitors to adequately serve in high frequency charging or discharging applications at those high temperatures to be practical or even usable. Instead, these existing high temperature capacitors are generally only usable for pulsed power or very low frequency charging or discharging.

Referring now to the drawings in general, the illustrations are for the purpose of describing one or more preferred embodiments of the invention and are not intended to limit the invention thereto.

The present invention is directed to a multilayered dielectric film for use in thin-film capacitors. The multilayered dielectric film includes a plurality of discrete polymer layers. In one embodiment, the plurality of discrete polymer layers include one or more layers of a first type, referred to herein as A layers, and one or more layers of a second type, referred to herein as B layers. One of ordinary skill in the art will understand that the plurality of discrete polymer layers is not limited to only two types of layers, but is able to have any number of types of layers (e.g., 3 types of layers, 4 types of layers, etc.). A type of layer as referenced herein describes layers being composed of substantially similar materials in substantially similar proportions, having substantially similar additives, and having substantially similar thicknesses. By way of example and not limitation, A layers are defined as including 10% cyclic olefin copolymers (COCs) and 90% polypropylene (PP) by volume and having thicknesses of approximately 75 nm. In this embodiment, a layer consisting of pure polypropylene, for example, is therefore not an A layer, but constitutes a second type of layer (i.e., a B layer).

In one embodiment, the plurality of layers of the multilayered dielectric film are organized in a simple alternating pattern (i.e., ABABABA, etc.). In another embodiment, the plurality of layers of the multilayered dielectric film are organized in a double alternating pattern (i.e., ABBABBA, AABAABAA, etc.). In yet another embodiment, the plurality of layers of the multilayered dielectric film are organized in a complex pattern (e.g., ABBABAABABBABAAB, etc.). In still another embodiment, the plurality of layers of the multilayered dielectric film are not organized in any repeating pattern.

In one embodiment, the plurality of layers are stacked as substantially parallel planar sheets, such that the interface between layers lies approximately along an x-y plane of an x-y-z coordinate system, while the layers of multilayered dielectric film change with depth, along the z-axis. Therefore, the thickness of each layer is able to be defined as the length of each layer in the z-direction. The total thickness of the entire multilayered dielectric film is therefore able to be defined as the sum of the thicknesses of each individual layer. One of ordinary skill in the art will understand that the length and width of the multilayered thin film along the x- and y-axes respectively are not intended to be limiting and the length and width of the multilayered thin film are able to be adapted to whatever size of thin film capacitor is needed for the intended application. In one embodiment, each of the plurality of layers have approximately the same thickness, while, in another embodiment, the plurality of layers includes layer types having differing thicknesses.

In one embodiment, the plurality of layers of the multilayered dielectric film are not bonded by at least one tie layer. A tie layer is generally defined as a thin thermoplastic coating used as a melt bondable surface to adhere adjacent layers. Tie layers are chiefly concerned with maintaining structural integrity of the layered structure, but typically worsen performance, as they decrease, by at least some amount, the overall volume taken up by polymers more relevant to the intended purpose (i.e., the dielectric polymers or high temperature polymers as described herein). Prior art inventions, such as U.S. Pat. No. 10,614,958, often require tie layers in order to create a stable layered structure. In one embodiment, the plurality of layers are each bonded by at least one tie layer.

In one embodiment, the multilayered dielectric film is formed by coextrusion of a first polymer mix, a second polymer mix, and/or additional polymer mixes in order to form a first layer, a second layer, and/or additional layers, respectively. In one embodiment, the first polymer mix, the second polymer mix, and/or the additional polymer mixes are substantially immiscible such that they form discrete, separate layers during extrusion. Advantageously, immiscibility of the polymer layers decreases energy dissipation across polymer phase boundaries within the film, allowing for better capacitor performance. In one embodiment, the layers formed through coextrusion are then vertically multiplied by cutting the flow vertically with a first multiplier die, which then stacks the split stacks vertically to form a vertically layered structure with double the number of layers, as described in such references as U.S. Patent Publication Nos. 2013/0194677 and 2017/0197348, each of which is incorporated herein by reference in its entirety. In one embodiment, the vertical layer multiplication is repeated more times (e.g., 2 more, 4 more, 8 more, 32 more, etc.) in order to yield a desired number of layers. One of ordinary skill in the art will understand that the process of vertical layer multiplication multiplies the number of horizontal layers by two, meaning that the number of layers will be equal to $2^{n+1}$, where n is equal to the number of multiplication steps. In this way, even as low as nine multiplier die are able to produce a structure having thousands of layers. By altering the volumetric flow rate of the polymer layers through the dies, the thickness of the layers and the thickness of the film as a whole are able to be more precisely controlled. In one embodiment, at least one skin layer is extruded or otherwise deposited on the top and/or bottom of the layered structure after layer multiplication is complete. In one embodiment, the at least one skin layer includes at least one metallization layer. In one embodiment, the layers are created simultaneously in a single multichannel feed block die producing tens, hundreds, or thousands of layers without subsequent multiplication.

In the present invention, in one embodiment, in order to form a layer including a high heat stability polymer, a melt including the high heat stability polymer is coextruded. Similarly, in order to form a layer including a dielectric polymer, a melt including the dielectric polymer film is coextruded. Therefore, in this embodiment, the high heat stability polymer and the dielectric polymer are included in the coextrusion process itself, not through subsequent processing or inclusion. Alternatively, in another embodiment, the high heat stability polymer and/or dielectric polymer are included in one or more coextruded layers after the coextruded layers are formed.

The multilayered dielectric film of the present invention is not limited to being formed from cast coextrusion methods as described above. In another embodiment, the multilayered dielectric film is formed via blown coextrusion, three-dimensional (3D) printing, lamination, spin-coating, vapor deposition, and/or extrusion coating methods.

In one embodiment, at least one A layer of the multilayered dielectric film includes at least one dielectric polymer film. Examples of dielectric polymers include, but are not limited to, polypropylene (PP) (including biaxially oriented PP, or BOPP), polyethylene terephthalate (PET) (including biaxially oriented PET, or BOPET), polyethylene naphthalate (PEN), polyphenylene sulfide (PPS), polytetrafluoroethylene (PTFE), polystyrene (PS), acrylic, polyethylene (PE), polybutene, poly(propylene oxide), poly(ethylene imine), thio-alkane, polyvinyl alcohol (PVA), poly(vinylidene carbonate), polyacrylonitrile, polyvinylsulfone, poly(p-phenylene tereththalamide), poly(vinylpyrrolidone), polyethylene-norborene copolymers (e.g., TOPAS COC copolymers, ZEONOR, etc.), polyimide, and polycarbonate (PC). In a preferred embodiment, the at least one A layer includes polypropylene (PP) (e.g., BOPP) and/or polyethylene terephthalate (PET). In one embodiment, at least one B layer of the multilayered dielectric film includes at least one high heat stability polymer. A high heat stability polymer, for the purposes of the present application, is a polymer having a glass transition temperature of greater than approximately 125° C. or a melting temperature greater than approximately 200° C. In one embodiment, the at least one high heat stability polymer includes a polymer having a relatively low dielectric constant (and is therefore not traditionally used as a dielectric). Examples of high heat stability polymers include, by way of example and not limitation, polyimide, polysulfone (PSU), polyethylene naphthalate (PEN), polyetherimide (PEI), polyether ether ketone (PEEK), polyphenylsulfone, cyclic olefin copolymers (COCs), at least one high temperature fluoropolymer (e.g., polychlorotrifluoroethylene (PCTFE), ethylenechlorotrifluoroethylene (ECTFE), etc.), at least one liquid crystal polymer, borosilicate, polynorborne, or any polymer including these polymers as copolymers. In one embodiment, the at least one dielectric film is mixed with at least one dielectric enhancing additive, including but not limited to barium titanate and/or carbon nanotubes. In one embodiment, both the at least one A layer and the at least one B layer include the same or a different percentage of the at least one dielectric polymer and/or the at least one high heat stability polymer.

In one embodiment, the present invention includes a film including between about 10% and about 30% COC by volume and between about 70% and about 90% PP by volume, while in a more particular embodiment, the film includes about 10% COC by volume and about 90% PP by volume. In one embodiment, the present invention includes a film including about 50% PPS and about 50% PSU by volume. In one embodiment, the present invention includes a film including between about 10% and about 30% PC by volume and between about 70% and about 90% PP by volume, while in a more particular embodiment, the film includes about 10% PC by volume and about 90% PP by volume In one embodiment, the multilayered dielectric film is oriented in at least one direction (i.e., monoaxially oriented, biaxially oriented, etc.). In one embodiment, the process of biaxial orientation is able to produce a much thinner film, between about 5 times thinner and about 50 times thinner than before the orientation process begins. In one embodiment, the at least one direction of orientation is substantially parallel to a surface of the multilayered dielectric film at a ratio effective to increase the breakdown strength of the film. In one embodiment, biaxial orientation of the film increases the breakdown strength of the film by approximately 20%.

In one embodiment, each layer of the multilayered dielectric film has a dielectric permittivity ratio between approximately 0.5 and approximately 1.5 times the dielectric permittivity ratio of adjacent layers. This stands in stark contrast with the prior art, including U.S. Pat. Nos. 10,759, 139 and 10,614,958, which assume a high contrast in dielectric permittivity between layers in order to maximum energy density. However, the types of layers of the multilayered dielectric film differ sharply in terms of other properties, including storage modulus, glass transition temperature, and melting temperature. In one embodiment, the combination of the dielectric material layers and the high heat stability layers provides a multilayered dielectric film experiencing dielectric losses of less than a threshold of 0.5% at temperatures 10-15° C. greater than traditional dielectric films (e.g., pure PPS or pure PP films). In one embodiment, the multilayered dielectric film experiences a drop in storage modulus of about 50% relative to the storage modulus at room temperature at a temperature 10-15° C. greater than the temperature where a homogeneous film experiences a drop in storage modulus of about 50% relative to a storage modulus for the homogeneous film at room temperature, wherein the homogeneous film is composed substantially of the polymer used in the at least one A layer of the multilayered dielectric film. In one embodiment, the multilayered dielectric film has a greater breakdown strength than at least one of the constituent materials.

In one embodiment, each of the plurality of layers of the multilayered dielectric film has a thickness less than one micron. In one embodiment, the multilayered dielectric film is between approximately 1 µm and approximately 50 µm. In one embodiment, the total thickness of the multilayered dielectric film is between approximately 3 µm and approximately 15 µm (or more specifically between approximately 12 µm and approximately 15 µm). In one embodiment, each layer has a thickness lower than approximately 1.2 µm. In a preferred embodiment, each layer has a thickness between approximately 150 nm and approximately 400 nm. In another embodiment, at least one layer has a thickness lower than approximately 150 nm. One of ordinary skill in the art will understand that each layer need not have the same thickness within an established range (i.e., within the range of 150-400 nm, one layer type has a thickness of approximately 200 nm and another layer type has a thickness of approximately 300 nm).

One of ordinary skill in the art will understand that the film produced according to the present invention is able to be used in different forms of capacitors, including in metallized film capacitors and in film/foil capacitors.

Experiments were performed evaluating two different embodiments of the present invention, including one layered structure that is approximately 50% PPS and approximately 50% PSU by volume and a second layered structure this is approximately 10% COC and approximately 90% PP by volume. These layered polymers were compared with homogeneous films including only a constituent dielectric film material (i.e., PPS and PP, respectively). These experiments resulted in the charts shown in FIGS. 1-4.

FIG. 1 illustrates a chart comparing the storage modulus of polyphenylsulfone (PPS) and a layered polymer structure of PPS and polysulfone (PSU) at different temperatures according to one embodiment of the present invention. As shown in FIG. 1, the homogeneous PPS film actually demonstrated a higher storage modulus at lower temperatures, but shows a steep drop off near 100° C. The layered PPS/PSU material, on the other hand, has a relatively lower storage modulus at lower temperatures, but the storage modulus remains consistent until approximately 165° C. Until that point, the storage modulus remains above approximately 1000 MPa. In one embodiment, the PSU used as a high heat stability polymer for the present invention has a glass transition temperature of approximately 180° C.

Figure 2:
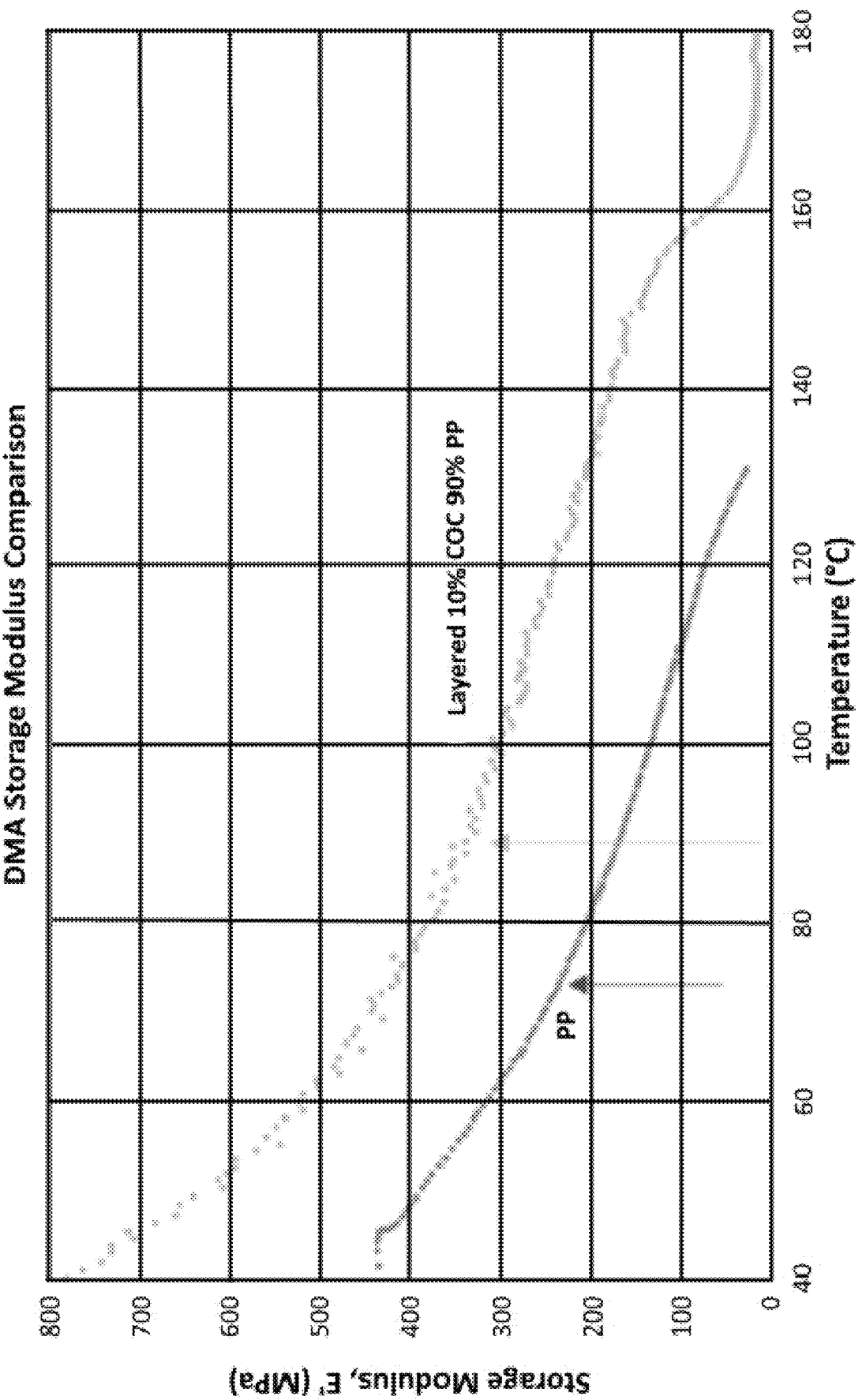
FIG. 2 illustrates a chart comparing the storage modulus of polypropylene (PP) and a layered polymer structure of PP and cyclic olefin copolymer (COC) at different temperatures according to one embodiment of the present invention.

FIG. 2 illustrates a chart comparing the storage modulus of polypropylene (PP) and a layered polymer structure of PP and cyclic olefin copolymer (COC) at different temperatures according to one embodiment of the present invention. In one embodiment, COC used as a high heat stability polymer for the present invention has a glass transition temperature of approximately 180° C. (substantially similar to that of the PSU). In one embodiment, COC, when used as a high heat stability polymer for the present invention, has a glass transition temperature greater than approximately 120° C. Alternatively, a layered film with 10% COC and 90% PP by volume shows a greater storage modulus at all tested temperatures and does not exhibit significant mechanical degradation or decrease in strength until approximately 160° C. In one embodiment, the present invention includes a film having between about 10% and about 30% COC by volume and between about 70% and about 90% PP by volume, while in a more particular embodiment, the film includes about 10% COC by volume and about 90% PP by volume.

Figure 3:
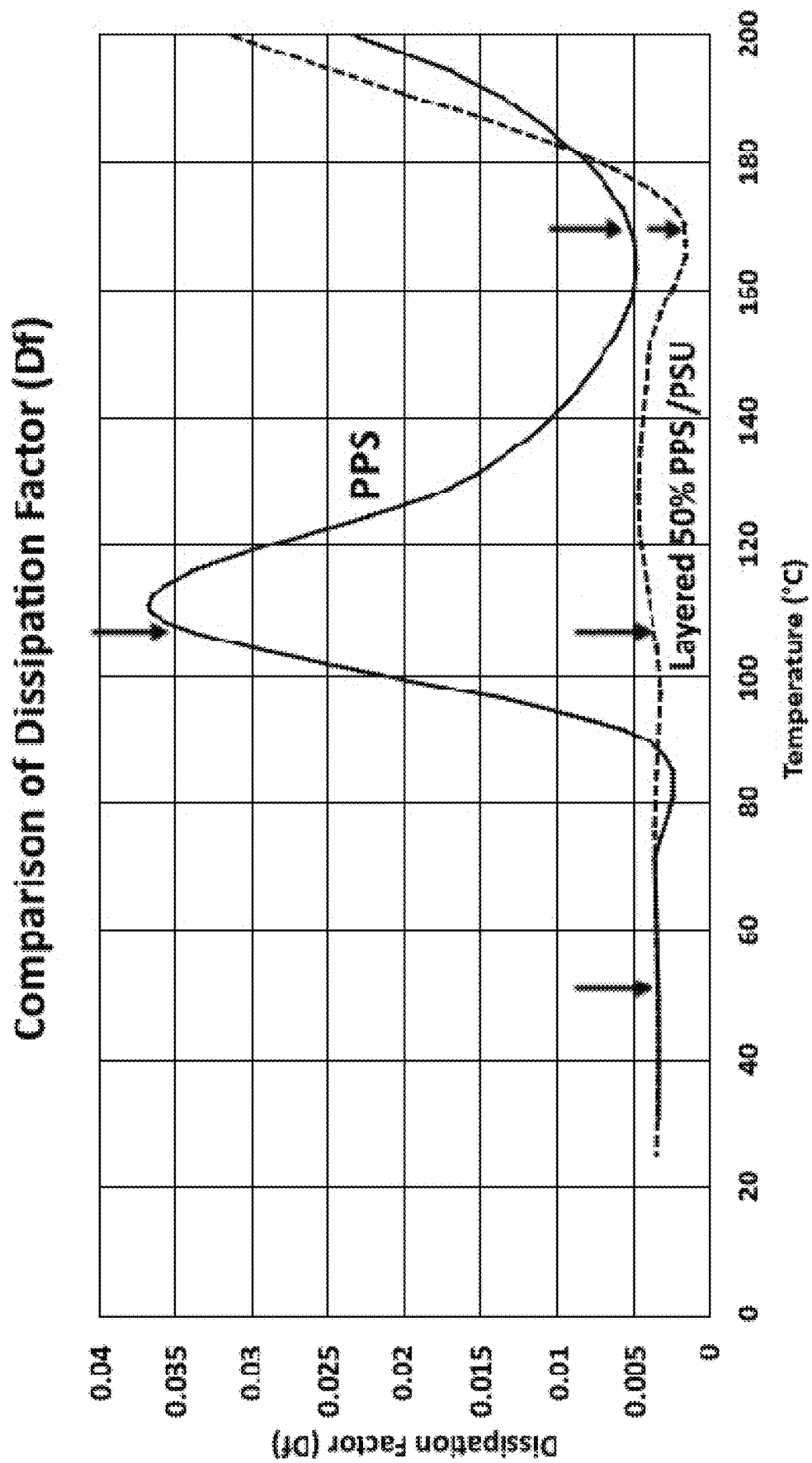
FIG. 3 illustrates a chart comparing the dissipation factor of polyphenylsulfone (PPS) and a layered polymer structure of PPS and polysulfone (PSU) at different temperatures according to one embodiment of the present invention.

FIG. 3 illustrates a chart comparing the dissipation factor of polyphenylsulfone (PPS) and a layered polymer structure of PPS and polysulfone (PSU) at different temperatures according to one embodiment of the present invention. As shown in FIG. 3, the homogeneous PPS film shows a significant increase of dissipation factor in the range of approximately 100° C. to approximately 140° C., while the layered polymer maintains a low dissipation factor throughout this range, greatly increasing its efficiency at high temperature values.

Figure 4:
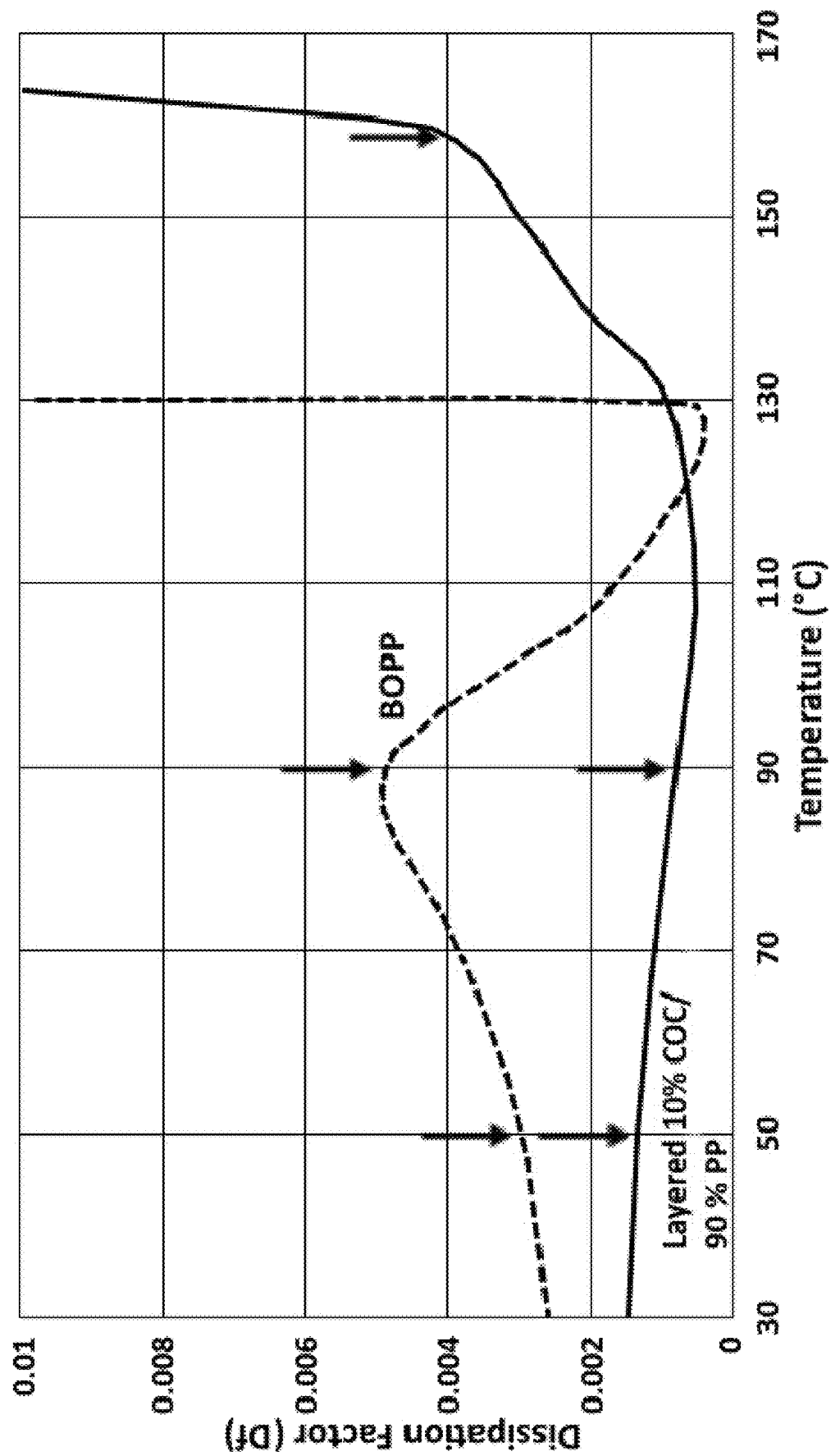
FIG. 4 illustrates a chart comparing the dissipation factor of biaxially-oriented polypropylene (BOPP) and a layered polymer structure of PP and cyclic olefin copolymer (COC) at different temperatures according to one embodiment of the present invention.

FIG. 4 illustrates a chart comparing the dissipation factor of biaxially-oriented polypropylene (BOPP) and a layered polymer structure of PP and cyclic olefin copolymer (COC) at different temperatures according to one embodiment of the present invention. FIG. 4 demonstrates that a layered film demonstrates a lower dissipation factor than the homogeneous BOPP film for nearly all temperature values, especially around 90° C. Furthermore, the BOPP film failed completely above 130° C., while the layered polymer does not exhibit a rapid rise in dissipation factor until approximately 160° C.

Table 1 below shows a comparison of dissipation factors for each tested polymer at three different temperatures. As shown by the chart, other than PPS film and the layered PPS/PSU film compared at low temperatures, the layered polymers demonstrated lower dissipation factors, and therefore lower power losses. For the homogeneous BOPP, the dissipation factor at 160° C. was not able to be measured as the film had broken down entirely, while the layered polymer continued to function.

of 3 melt flow rate (MFR) PP and PC in a cast film process, with the PC having a glass transition temperature of 165° C.

Example 3 (50% PPS/PSU 33 Layers)

Example 3 was a film including 50% polyphenylene sulfide (PPS) and 50% polysulfone (PSU) by volume. The example 3 film included 33 layers created by coextruding alternating nanolayered sheets of 3 melt flow rate (MFR) PPS and PSU in a cast film process, with the PSU having a glass transition temperature of 185-190° C. and the PPS grade having a melting point of 280° C. and a glass transition temperature of 90° C.

Comparative Example 1 (BOPP)

The comparative example 1 sample was a commercially available biaxially oriented PP film.

Comparative Example 2 (100% PP Extruded)

The comparative example 2 sample was a single layer dielectric film extruded utilizing a cast film process from a 3 MFR polypropylene (PP) grade.

Comparative Example 3 (10% COC/90% PP Blend)

The comparative example 3 sample was a single layer dielectric film extruded utilizing a cast film process from a

TABLE 1

Dielectric Loss v. Temperature Values For Homogenous and Layered Structures

| Film | Temperature 1 (° C.) | Dissipation Factor 1 | Temperature 2 (° C.) | Dissipation Factor 2 | Temperature 3 (° C.) | Dissipation Factor 3 |
|---|---|---|---|---|---|---|
| PPS | 50 | 0.0034 | 105 | 0.029 | 170 | 0.0054 |
| Layered 50% PPS/PSU | 50 | 0.0034 | 105 | 0.0036 | 170 | 0.0033 |
| BOPP | 50 | 0.0030 | 90 | 0.0049 | 160 | N/A |
| Layered 10% COC/90% PP | 50 | 0.0014 | 90 | 0.0008 | 160 | 0.0044 |

With regard to FIGS. 5-17, discussed below, the following polymer samples were used to compare relative dissipation factors at different temperatures and frequencies, storage moduli at different temperatures, and breakdown field strength at different temperatures.

Example 1 (Biax 10% COC/PP)

Example 1 was a film including 10% cyclic olefin copolymer (COC) and 90% polypropylene (PP) by volume. The example 1 film included 33 layers created by coextruding alternating nanolayered sheets of 3 melt flow rate (MFR) PP and COC in a cast film process, with the COC having a glass transition temperature of 158° C. The extruded film was then biaxially oriented above the glass transition temperature of COC, 5 times in the machine direction (MD) and 8 times in the transverse direction (TD).

Example 2 (10% PC/90% PP 129 Layers)

Example 2 was a film including 10% polycarbonate (PC) and 90% PP by volume. The example 2 film included 129 layers created by coextruding alternating nanolayered sheets dry blended 3 MFR PP grade and COC, with the COC having a glass transition temperature of 158° C. The blends included 10% COC and 90% of PP by volume.

Comparative Example 4 (10% PC/90% PP Blend)

The comparative example 4 sample was a single layer dielectric film extruded utilizing a cast film process from a dry blended 3 MFR PP grade and PC, the later having a glass transition temperature of 165° C. The blends included 10% PC and 90% PP respectively by volume.

Comparative Example 5 (100% PPS)

The comparative example 5 sample was a single layer dielectric film extruded utilizing a cast film process from PPS. The PPS grade used had a melting point of 280° C. and a glass transition temperature of 90° C.

In order to compare the samples, three different tests were performed. First, a breakdown strength test was performed on the film samples in a silicone oil medium under a direct current (DC) electric field, with a ramp rate of 500 V/s at elevated temperatures, in accordance with ASTM D149.

Second, dynamic mechanical analysis (DMA) was performed on the film samples in tensile mode at 5° C./min, at 1 Hz, and with 0.1% strain from room temperature up to 200° C. Finally, broadband dielectric spectroscopy (BDS) measurement was used to determine frequency and temperature dependent dielectric behavior of the materials. Both sides of each sample were sputter coated with a 20 nm thick gold electrode prior to the test, with the electrode having a diameter of approximately 1 cm. Temperature was varied from room temperature up to 180° C. at 20° C. intervals. For each temperature, frequency was varied between 100 Hz and 100 kHz.

Figure 5:
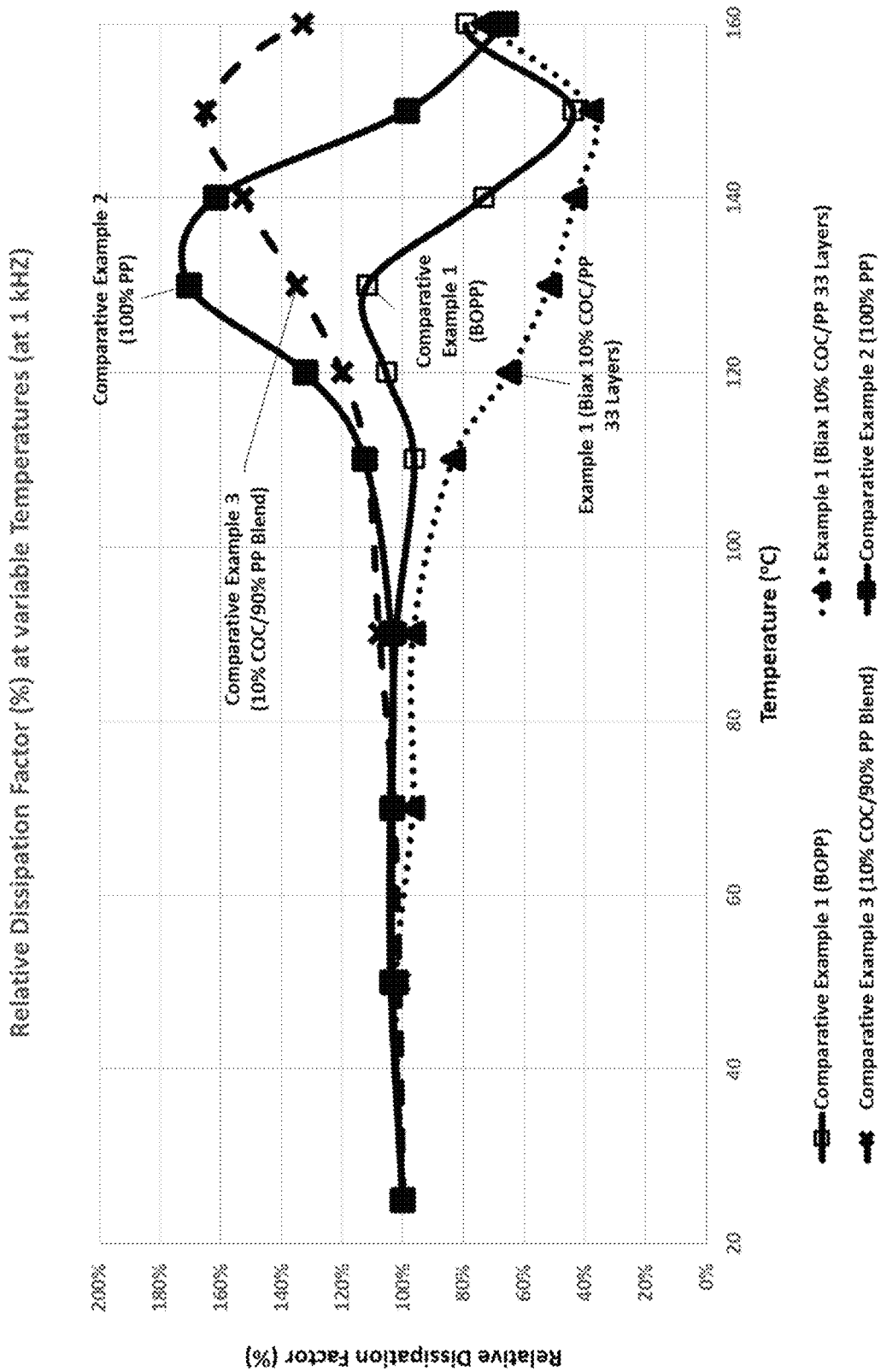
FIG. 5 illustrates an experimental results graph showing relative dissipation factor at different temperatures at 1 kHz for several film materials.

FIG. 5 illustrates an experimental results graph showing relative dissipation factor at different temperatures at 1 KHz for several film materials. The relative dissipation factor shown in the results of FIG. 5 is measured as a percentage of a dissipation factor demonstrated at room temperature. FIG. 5 demonstrates that while the layered example film (in this case utilizing COC and PP with 33 layers) showed a relative low, and even decreased, dissipation factor at temperatures between 100 and 150° C., the comparative examples of simple biaxially oriented (and non-oriented) polypropylene and then a simple blend of the sample volume of constituent polymers demonstrated peaks higher than the baseline between these temperatures. This demonstrates the particular improved effect of using layering in addition to orientation of the layers.

Figure 6:
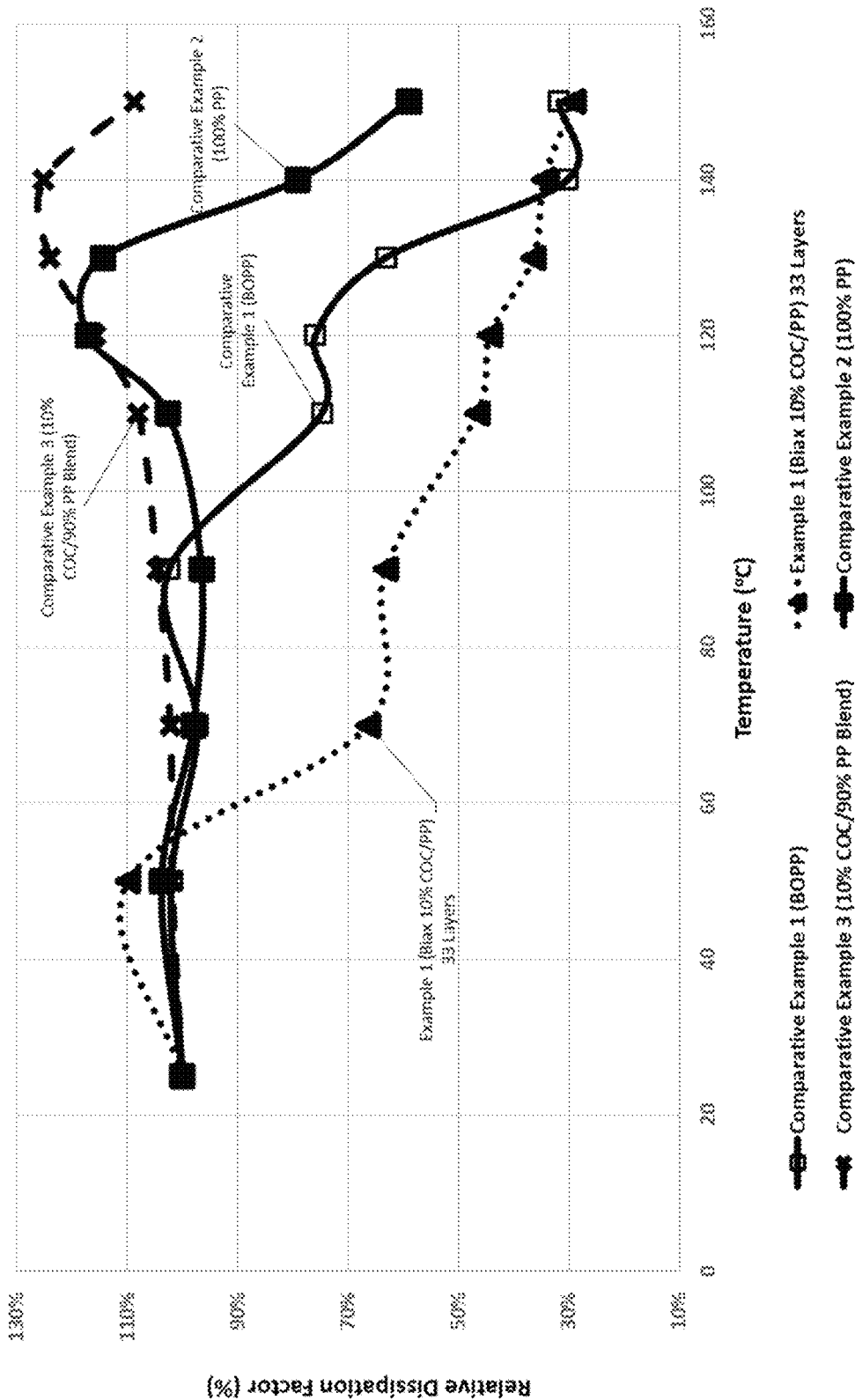
FIG. 6 illustrates an experimental results graph showing relative dissipation factor at different temperatures at 10 kHz for several film materials.

FIG. 6 illustrates an experimental results graph showing relative dissipation factor at different temperatures at 10 kHz for several film materials. At higher frequencies, the experimental, layered film still demonstrated decreased dissipation factors relative to uniform polypropylene and unlayered COC/PP blend samples at temperatures greater than about 60° C. Additionally, while the unlayered BOPP sample showed approximately equivalent dissipation factors between about 140 and 150° C., the experimental film still demonstrated substantially decreased dissipation factors between 60° C. and 140° C.

Figure 7:
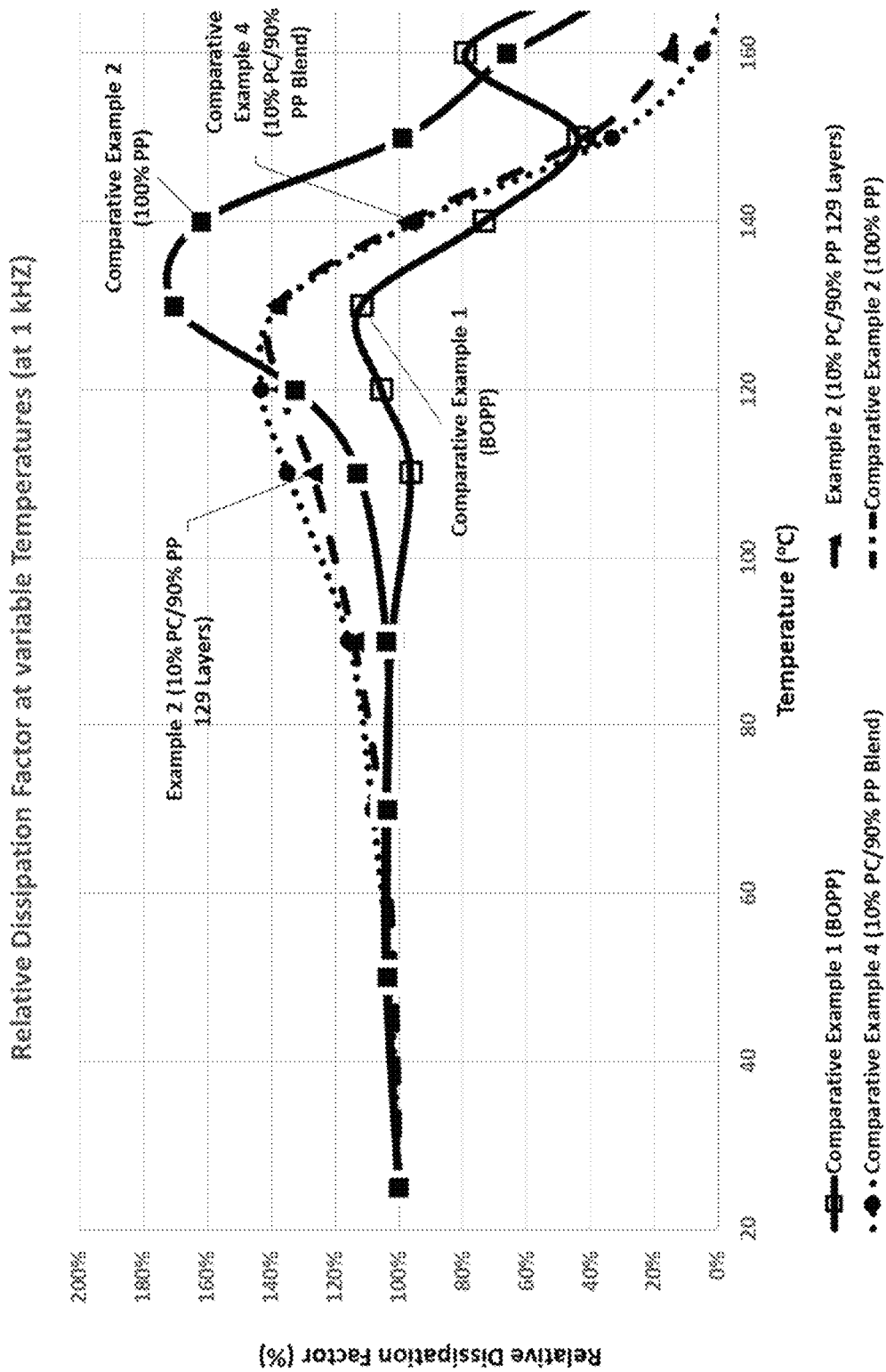
FIG. 7 illustrates an experimental results graph showing relative dissipation factor at different temperatures at 1 kHz for several different film materials.

FIG. 7 illustrates an experimental results graph showing relative dissipation factor at different temperatures at 1 KHz for several different film materials. Relative to the plain polypropylene film, the experimental 129 layer PC/PP film demonstrated decreased dissipation factors at temperatures greater than approximately 120° C. and demonstrated comparable properties to an unlayered blend of the same ratio of polymers. While the experimental film did show a higher dissipation factor than the BOPP film at temperatures between about 80 and 140° C., substantially decreased dissipation factors were seen in the experimental film at temperatures above 140° C.

Figure 8:
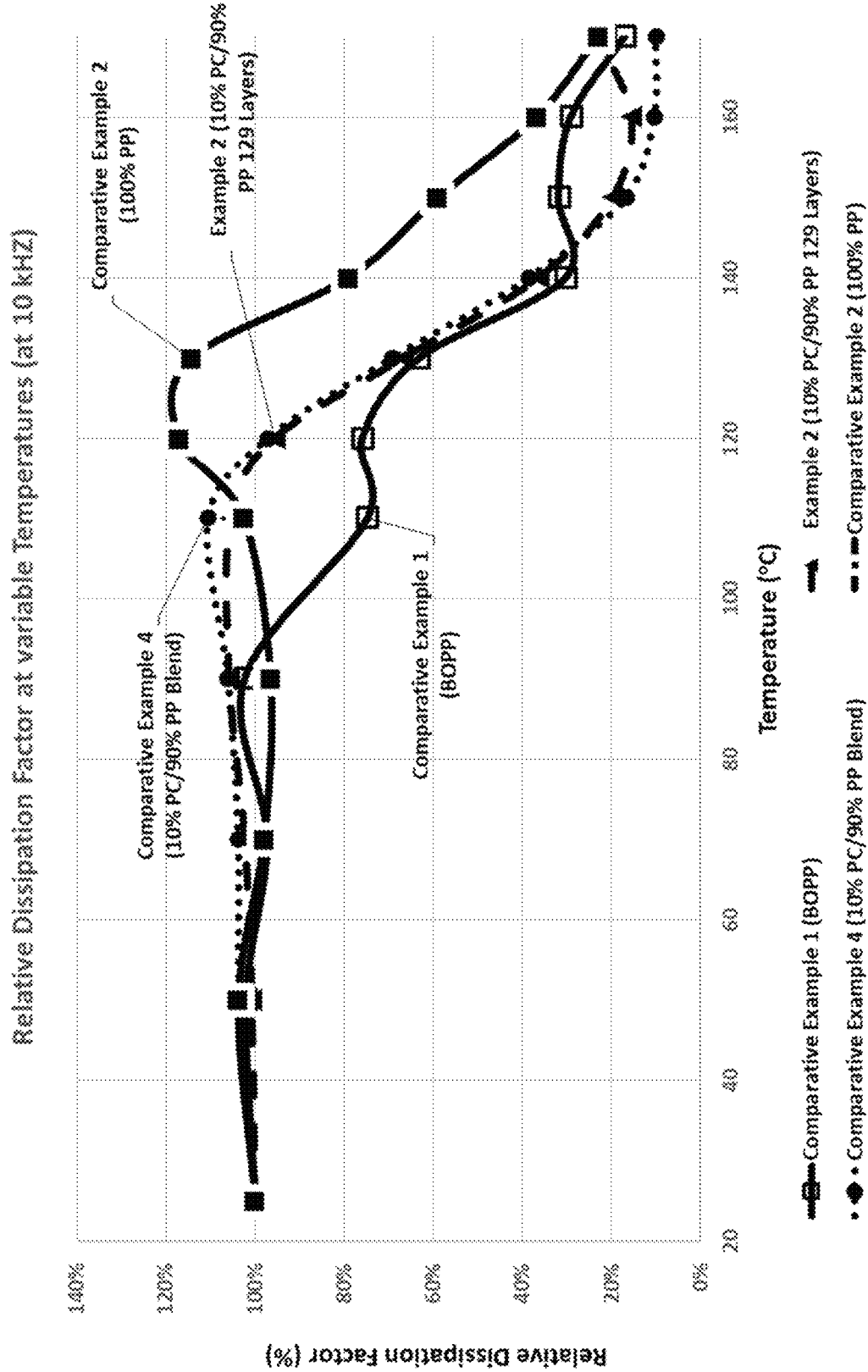
FIG. 8 illustrates an experimental results graph showing relative dissipation factor at different temperatures at 10 kHz for several different film materials.

FIG. 8 illustrates an experimental results graph showing relative dissipation factor at different temperatures at 10 kHz for several different film materials. Similar behavior relative to the comparative samples was observed at 10 kHz as was observed at 1 kHz for the 129 layer PC/PP film.

Figure 9:
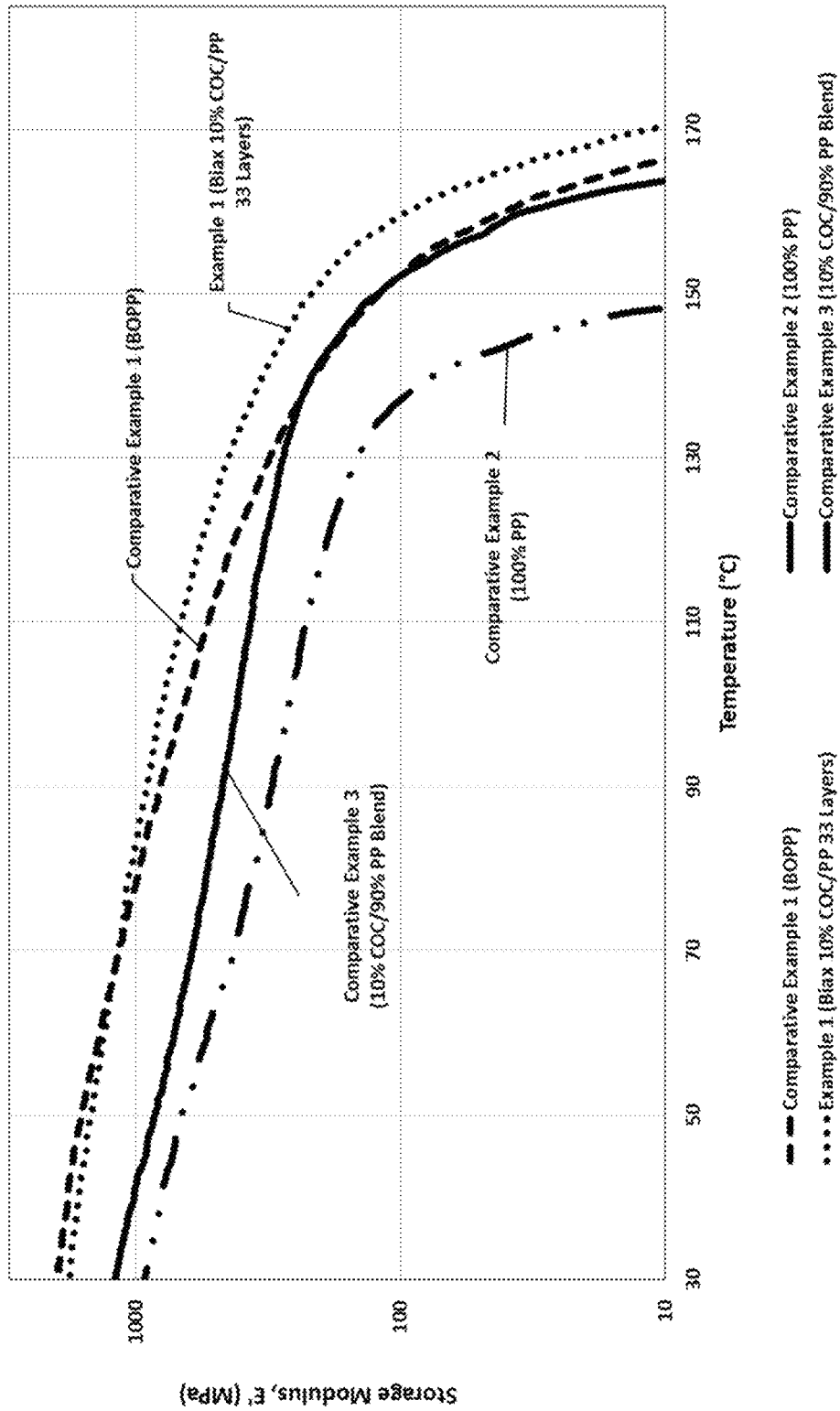
FIG. 9 illustrates an experimental results graph showing a storage modulus at different temperatures for several film materials.

FIG. 9 illustrates an experimental results graph showing a storage modulus at different temperatures for several film materials. The experimental 33 layer COC/PP film demonstrated improved storage modulus for nearly all temperatures, but especially at higher temperatures, relative to each of the comparative films tested, with the drop off in storage modulus occurring at a greater temperature (declining at about 160° C. and dissipating at about 170° C.) relative to even the best performing comparative sample (BOPP declining at about 150° C. and dissipating at about 165° C.)

Figure 10:
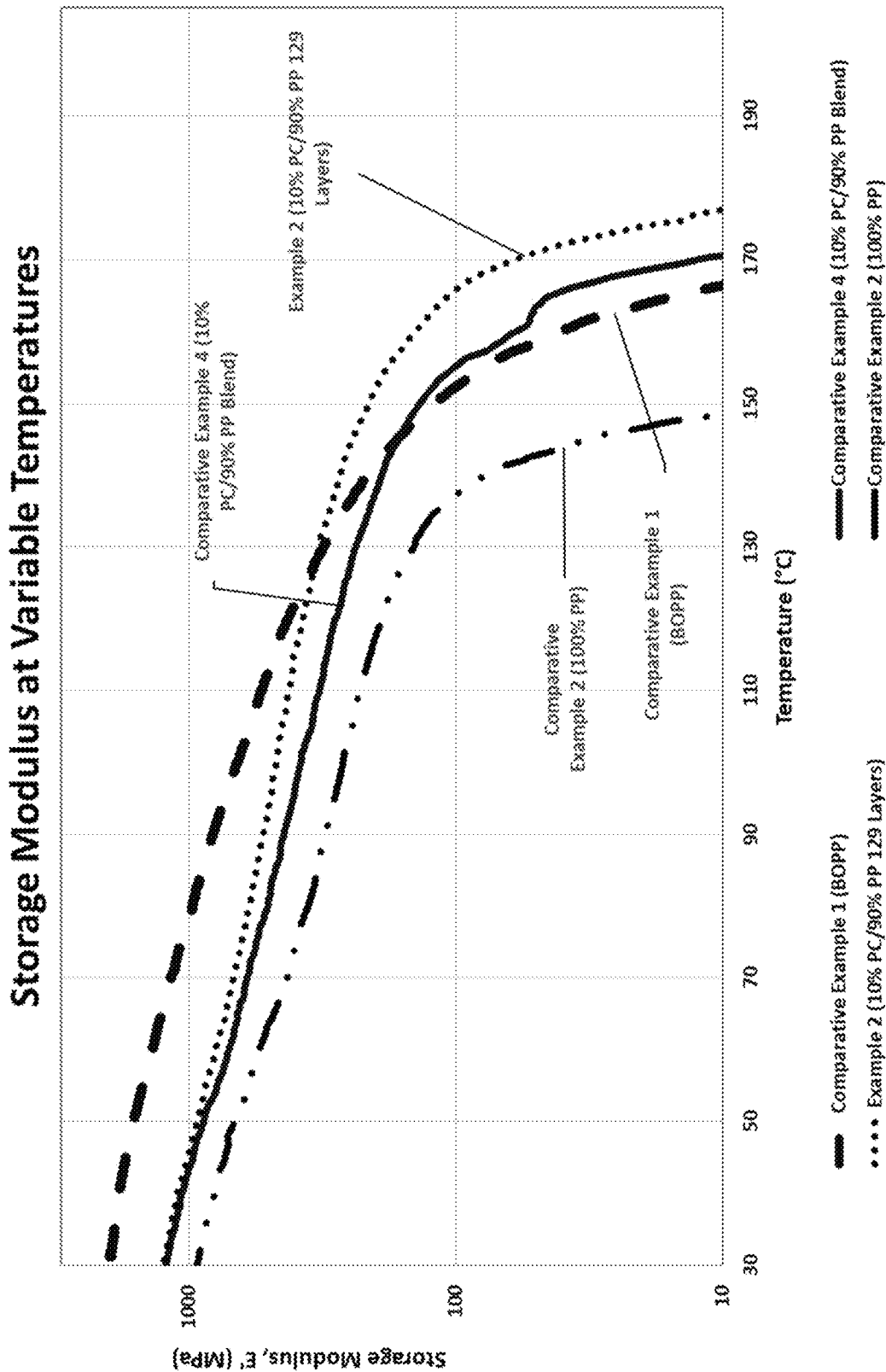
FIG. 10 illustrates an experimental results graph showing a storage modulus at different temperatures for several different film materials.

FIG. 10 illustrates an experimental results graph showing a storage modulus at different temperatures for several different film materials. The experimental 129 layer PC/PP film also demonstrated improved storage modulus at high temperatures, namely above about 130° C. relative to all comparative samples. However, the layered film notably demonstrated improved storage modulus at all temperatures relative to the unlayered blend sample, demonstrating particular benefit to the nanolayer structure.

Figure 11:
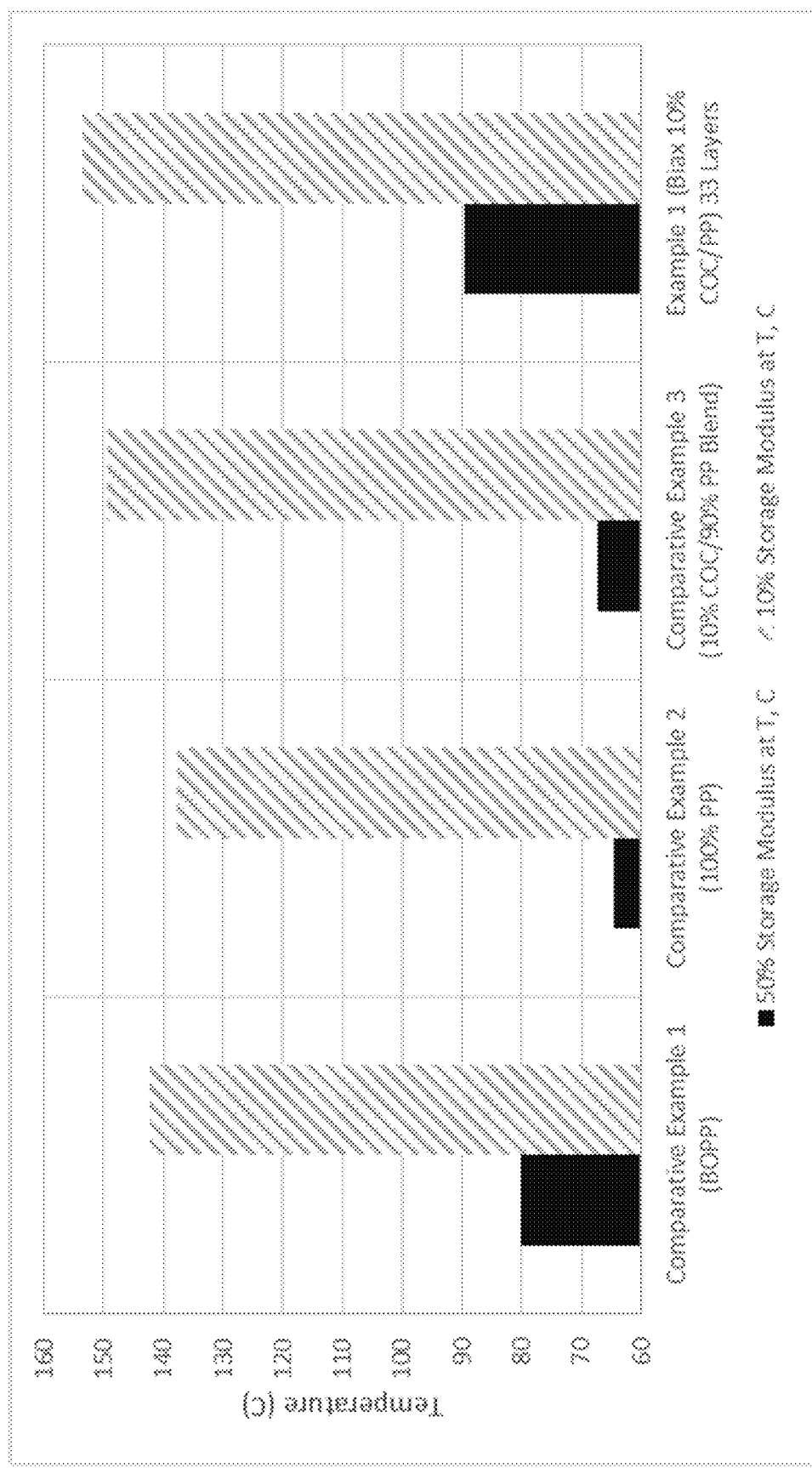
FIG. 11 illustrates an experimental bar graph comparison of temperatures at which several film materials demonstrated 50% and 10% storage modulus values relative to an initial test value.

FIG. 11 illustrates an experimental bar graph comparison of temperatures at which several film materials demonstrated 50% and 10% storage modulus values relative to an initial test value. The results of the storage modulus graphs above are easily visualized with the bar chart shown in FIG. 11, which shows pronounced increased in the temperature at which the storage modulus is at half that of room temperature relative to even the BOPP film and especially relative to the unlayered blend sample. Furthermore, even the temperature at which the experimental film reached a storage modulus only 10% of the room temperature value showed a pronounced increase relative to the unlayered blend.

Figure 12:
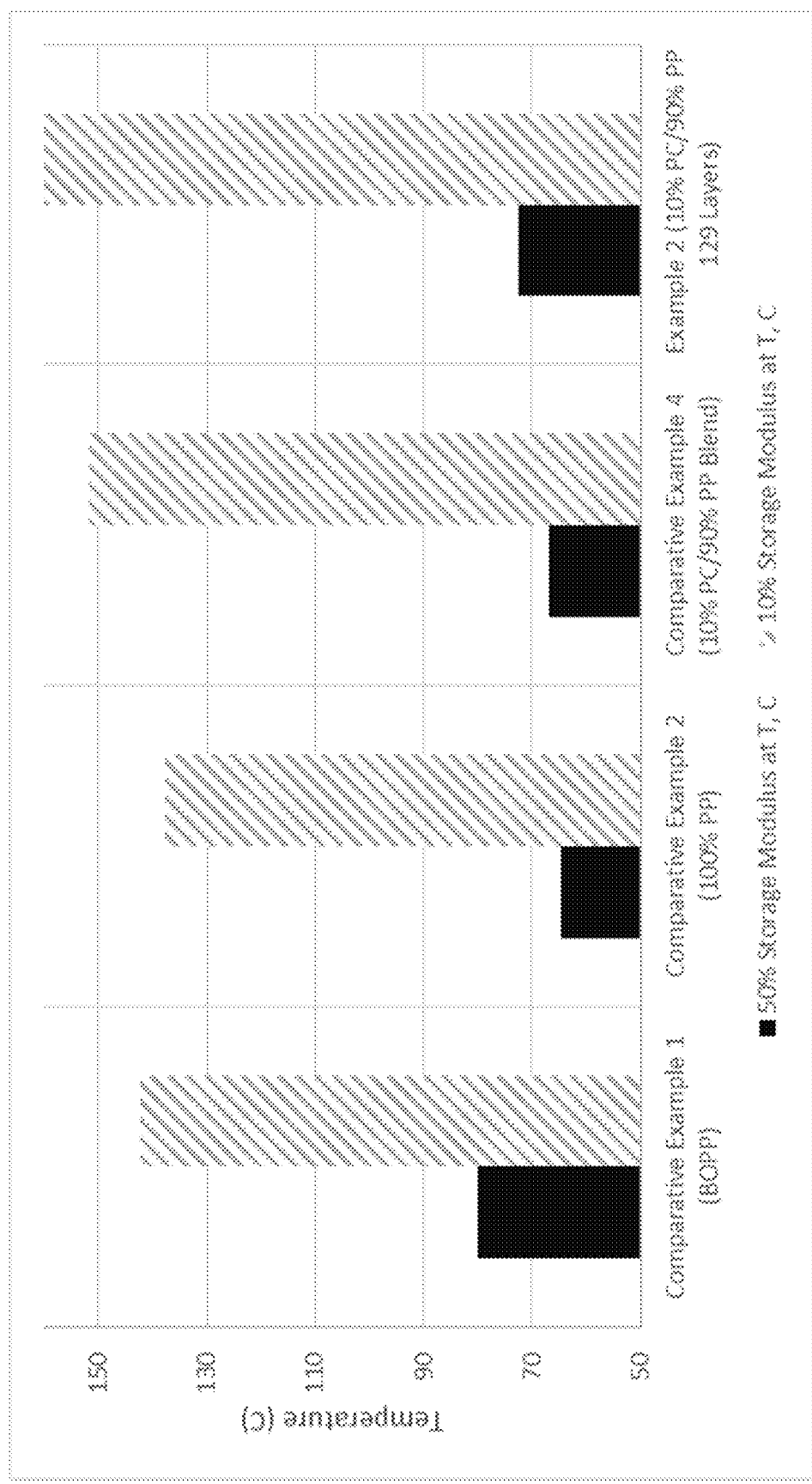
FIG. 12 illustrates an experimental bar graph comparison of temperatures at which several different film materials demonstrated 50% and 10% storage modulus values relative to an initial test value.

FIG. 12 illustrates an experimental bar graph comparison of temperatures at which several different film materials demonstrated 50% and 10% storage modulus values relative to an initial test value. The experimental 129 layer PC/PP film also demonstrated a large increased in the temperature at which a 10% storage modulus value was observed relative to all other samples, especially the BOPP film. While the 50% modulus temperature was decreased relative to the BOPP, it too was increased relative to the unlayered blend sample.

Figure 13:
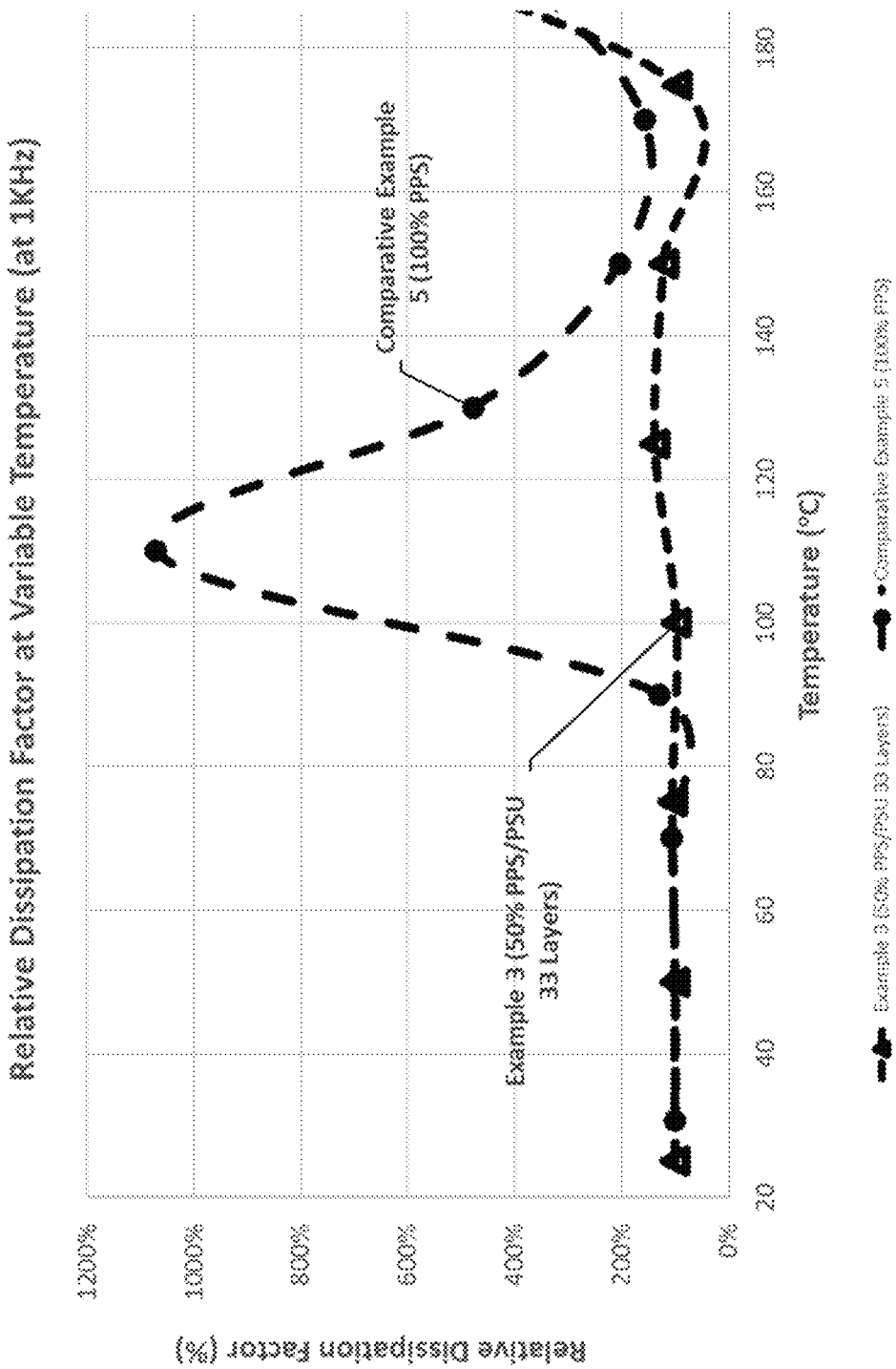
FIG. 13 illustrates an experimental results graph showing a comparison of relative dissipation factor at different temperatures at 1 KHz for a pure polyphenylene sulfide (PPS) film versus a layered PPS-polysulfone (PSU) film.

FIG. 13 illustrates an experimental results graph showing a comparison of relative dissipation factor at different temperatures at 1 KHz for a pure polyphenylene sulfide (PPS) film versus a layered PPS-polysulfone (PSU) film. The 33 layer PPS/PSU sample demonstrated a substantial improvement in dissipation factor relative to a pure PPS film, especially within the range between 90° C. and 150° C., eliminating a major spike in the dissipation factor of the pure PPS within that range.

Figure 14:
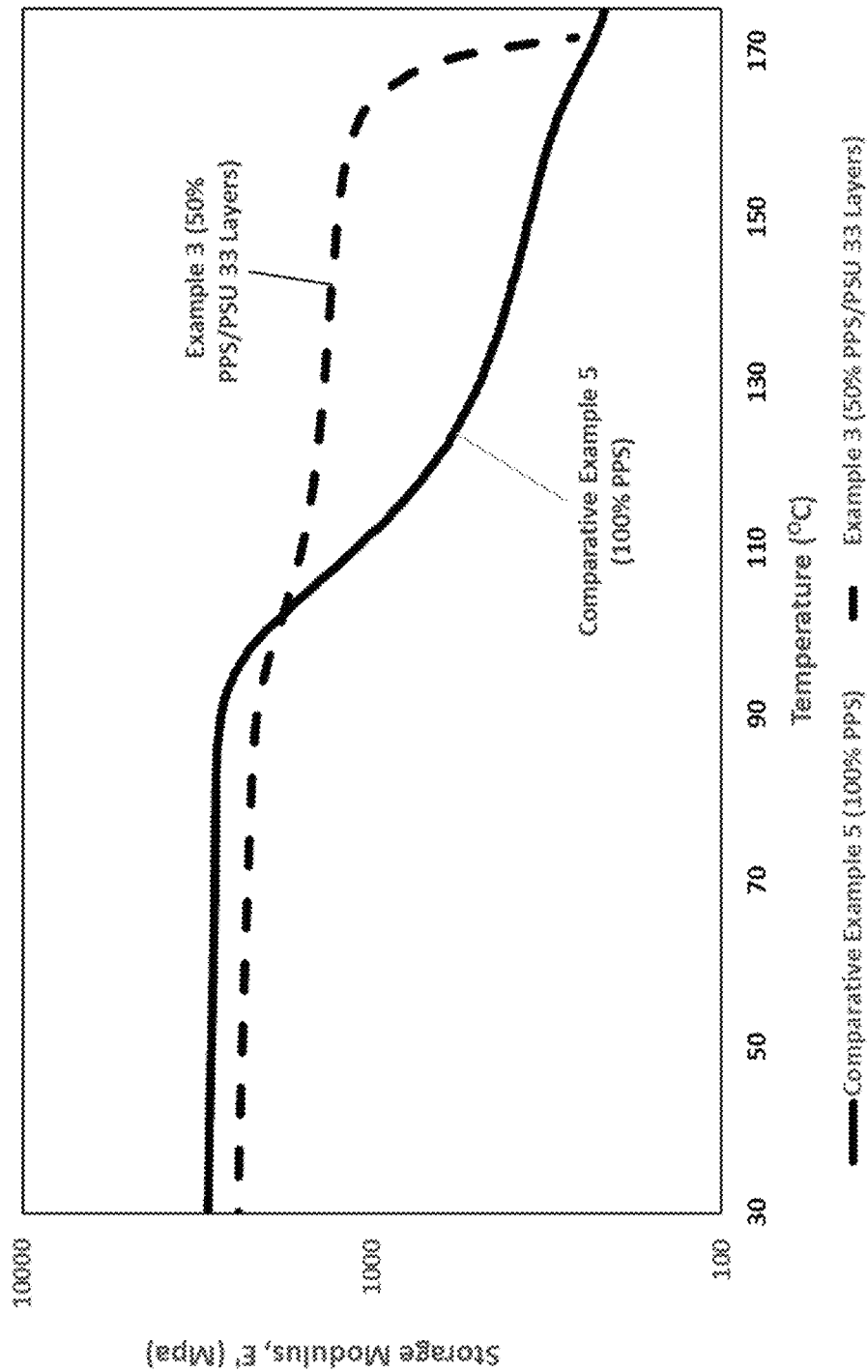
FIG. 14 illustrates an experimental results graph showing a comparison of storage modulus at different temperatures for a pure polyphenylene sulfide (PPS) film versus a layered PPS-polysulfone (PSU) film.
Figure 15:
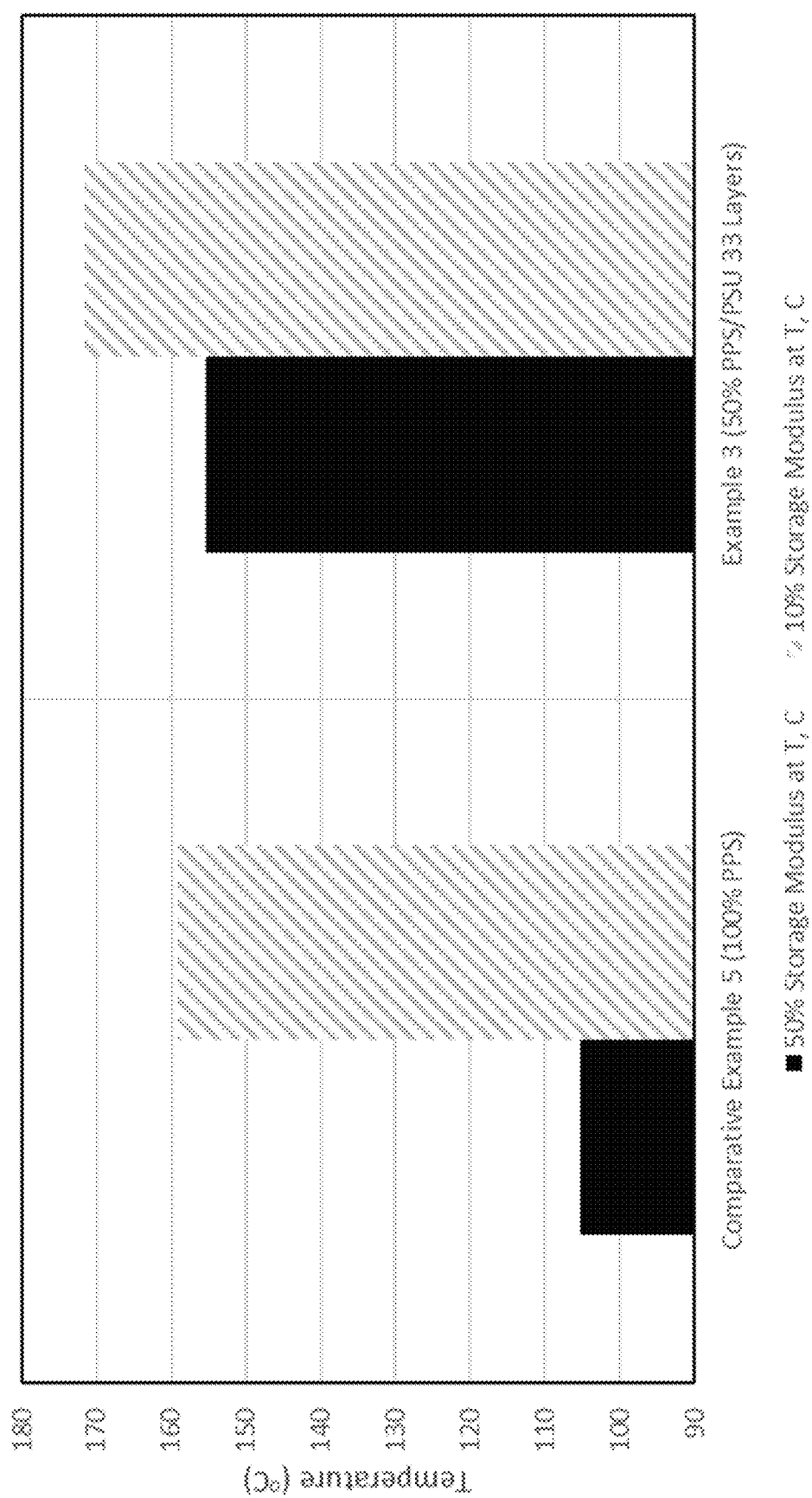
FIG. 15 illustrates an experimental results graph showing a comparison of temperatures at which several film materials demonstrated 50% and 10% storage modulus values relative to an initial test value for a pure polyphenylene sulfide (PPS) film versus a layered PPS-polysulfone (PSU) film.

FIG. 14 illustrates an experimental results graph showing a comparison of storage modulus at different temperatures for a pure polyphenylene sulfide (PPS) film versus a layered PPS-polysulfone (PSU) film. The 33 layer PPS/PSU sample also demonstrated a substantially increased storage modulus at higher temperatures, above approximately 100° C. relative to the pure PPS film. This improvement is easily seen in the bar graphs depicted in FIG. 15, with improvements of both the 50% storage modulus temperature and the 10% storage modulus temperature.

Figure 16:
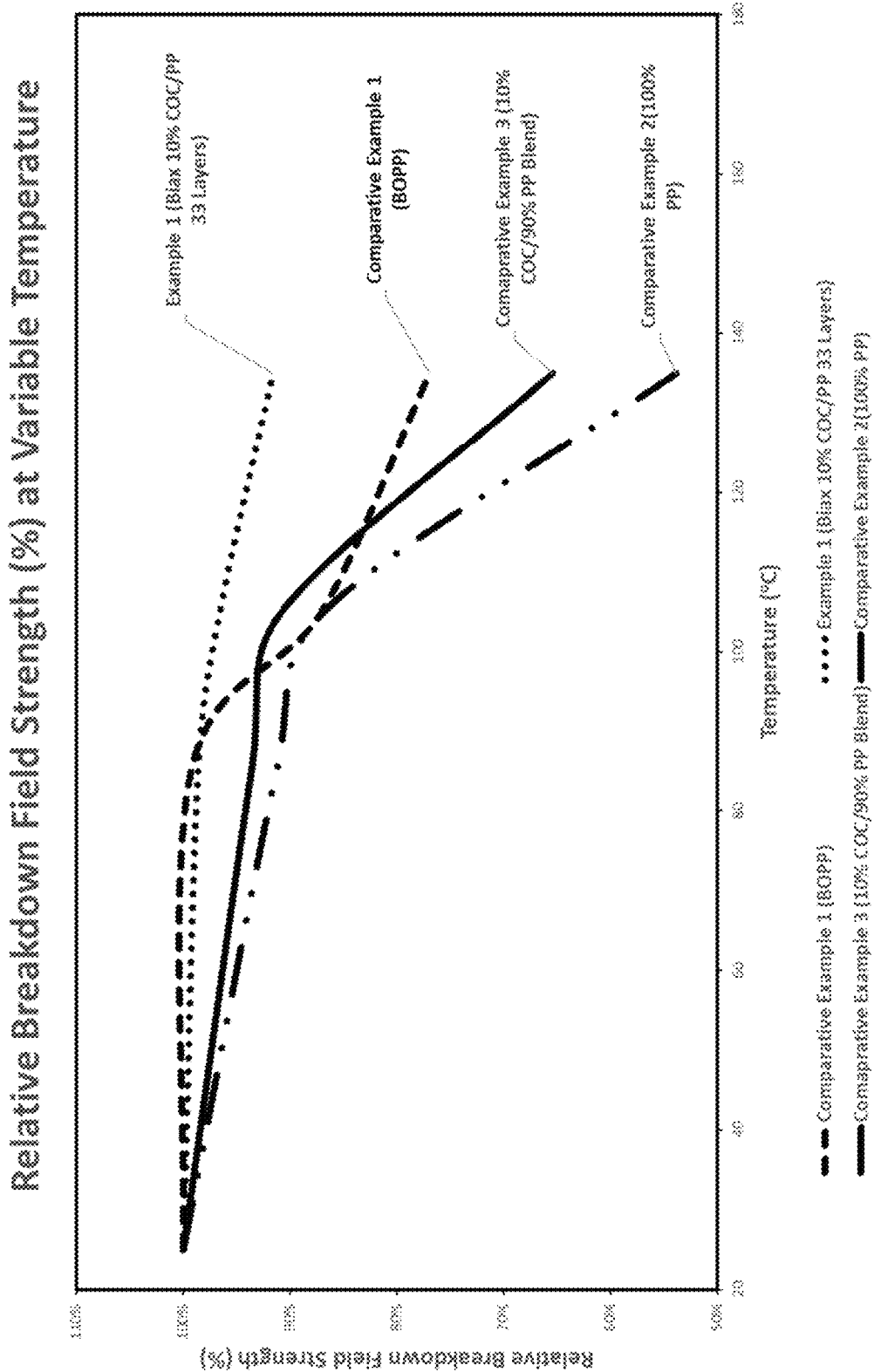
FIG. 16 illustrates an experimental results graph showing relative percentage breakdown field strength at different temperatures for several film materials.

FIG. 16 illustrates an experimental results graph showing breakdown field strength at different temperatures for several film materials. One of the clearest improvements for the experimental 33 layer COC/PP film was in relative breakdown strength, with the breakdown strength decreasing far less for the layered experimental film at temperatures greater than about 100° C. relative to each of the comparative samples.

Figure 17:
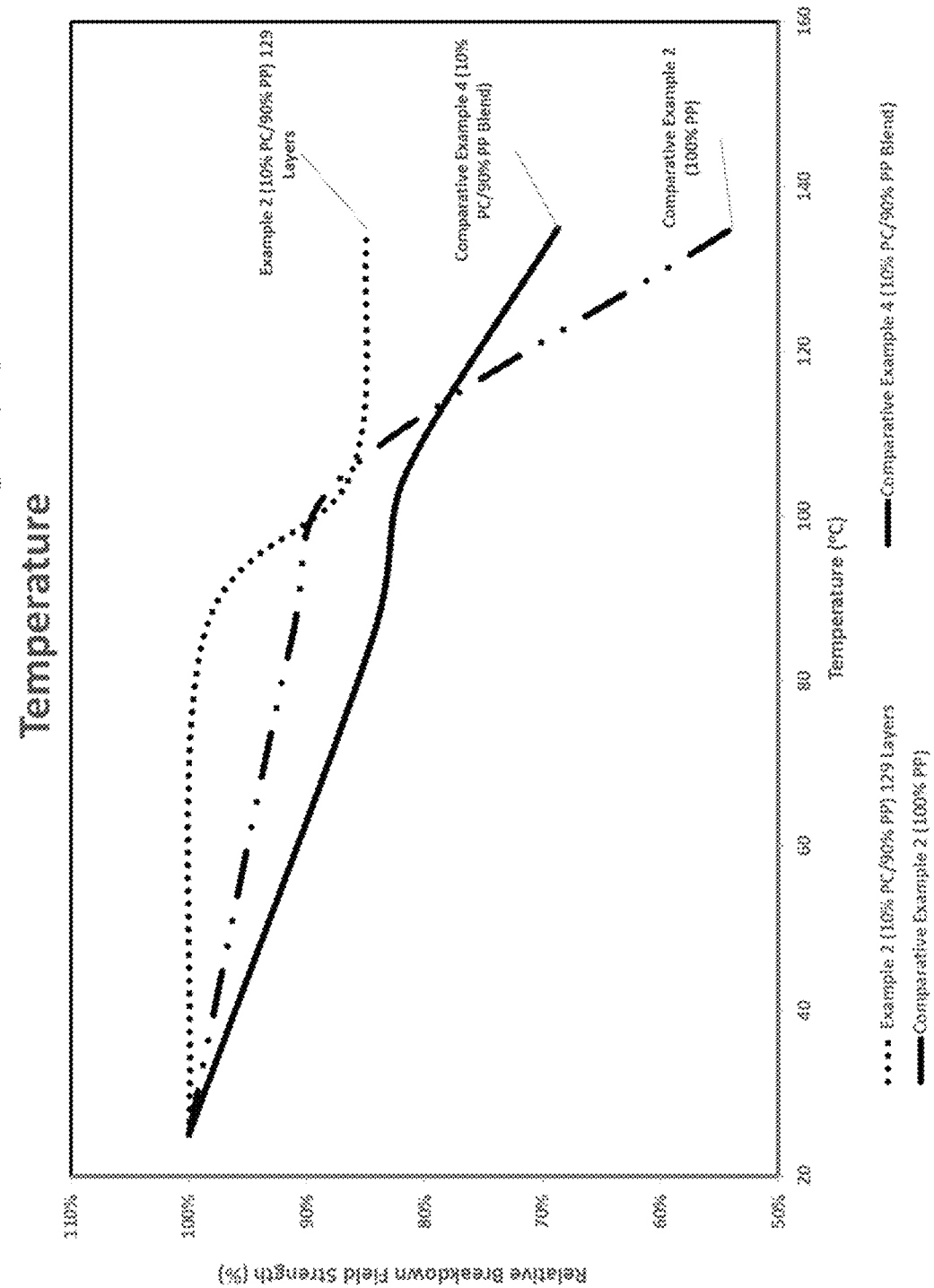
FIG. 17 illustrates an experimental results graph showing relative percentage breakdown field strength at different temperatures for several different film materials.

FIG. 17 illustrates an experimental results graph showing breakdown field strength at different temperatures for several different film materials. Similar to the 33 layer COC/PP film, the experimental PC/PP film also demonstrated substantially improved breakdown strength, not only at high temperatures, but even at temperatures between 20° C. and 90° C. as well.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A high temperature performance dielectric film, comprising:
   a coextruded plurality of layers, including a plurality of A layers and a plurality of B layers in a simple alternating pattern;
   wherein the plurality of A layers comprise at least one high temperature polymer;
   wherein the plurality of B layers consist of polypropylene;
   wherein the at least one high temperature polymer is a polymer having a glass transition temperature greater than 125° C. or a melting temperature greater than 200° C.; and
   wherein the plurality of A layers have a dielectric permittivity between 0.5 and 1.5 times greater than the plurality of B layers.

2. The film of claim 1, wherein the at least one high temperature polymer includes cyclic olefin copolymer (COC).

3. The film of claim 2, wherein the plurality of A layers consist of approximately 10-30% COC and approximately 70-90% polypropylene.

4. The film of claim 1, wherein the thickness of at least one of the coextruded and/or post-extrusion stretched plurality of layers is less than 150 nm.

5. The film of claim 1, wherein the coextruded plurality of layers do not include any tie layers.

6. The film of claim 1, wherein the film is incorporated in a capacitor.

7. A high temperature performance dielectric film, comprising:
   a coextruded plurality of layers, including a plurality of A layers and a plurality of B layers in a simple alternating pattern;
   wherein the plurality of A layers comprise at least one high temperature polymer;
   wherein the plurality of B layers consists of polypropylene;
   wherein the at least one high temperature polymer is a polymer having a glass transition temperature greater than 125° C. or a melting temperature greater than 200° C.; and
   wherein the plurality of A layers consist of approximately 10-30% cyclic olefin copolymer and approximately 70-90% polypropylene.

8. The film of claim 7, wherein each of the coextruded and/or post-extrusion oriented plurality of layers have a thickness less than 150 nm.

9. The film of claim 7, wherein the film has a total thickness between approximately 3 μm and approximately 15 μm.

10. The film of claim 7, wherein the coextruded plurality of layers do not include any tie layers.

11. The film of claim 7, wherein the film includes one or more skin or coating layers, and wherein the one or more skin or coating layers include at least one metallization layer.

12. The film of claim 7, wherein the film is incorporated in a capacitor.

13. A high temperature performance dielectric film, comprising:
   a coextruded plurality of layers, including a plurality of A layers and a plurality of B layers in a simple alternating pattern;
   wherein the plurality of B layers consists of polypropylene;
   wherein the plurality of A layers have a dielectric permittivity between 0.5 and 1.5 times greater than the plurality of B layers;
   wherein at least one of the coextruded plurality of layers have a thickness less than 150 nm; and
   wherein the film has a total thickness between approximately 3 μm and approximately 15 μm.

14. The film of claim 13, wherein the plurality of A layers comprise at least one high temperature polymer, and wherein the at least one high temperature polymer is a polymer having a glass transition temperature greater than 125° C. or a melting temperature greater than 200° C.

15. The film of claim 13, wherein the plurality of A layers and the plurality of B layers are in a simple alternating pattern within the film.

16. The film of claim 13, wherein the coextruded plurality of layers do not include any tie layers.

* * * * *